(12) United States Patent
Farino

(10) Patent No.: US 9,555,776 B2
(45) Date of Patent: Jan. 31, 2017

(54) PORTABLE UNDERCARRIAGE WASHER FOR VEHICLES

(71) Applicant: Joseph D. Farino, Hackettstown, NJ (US)

(72) Inventor: Joseph D. Farino, Hackettstown, NJ (US)

(*) Notice: Subject to any disclaimer, the term of this patent is extended or adjusted under 35 U.S.C. 154(b) by 0 days.

(21) Appl. No.: 14/670,189

(22) Filed: Mar. 26, 2015

(65) Prior Publication Data

US 2016/0280188 A1 Sep. 29, 2016

(51) Int. Cl.
- *B05B 3/00* (2006.01)
- *B60S 3/04* (2006.01)
- *B05B 1/20* (2006.01)
- *B05B 15/06* (2006.01)
- *B08B 3/02* (2006.01)

(52) U.S. Cl.
CPC .. *B60S 3/04* (2013.01); *B05B 1/20* (2013.01); *B05B 15/065* (2013.01); *B08B 3/022* (2013.01); *B08B 3/024* (2013.01)

(58) Field of Classification Search
CPC ............ B05B 1/20; B05B 15/065; B60S 3/04; B08B 3/024; B08B 3/022
USPC ............... 239/722, 754, 288, 288.3; 134/123
See application file for complete search history.

(56) References Cited

U.S. PATENT DOCUMENTS

| | | |
|---|---|---|
| 1,614,213 A | 1/1927 | Smith |
| 3,321,793 A | 5/1967 | Braunger |
| 3,342,191 A | 9/1967 | Haines |
| 3,795,254 A | 3/1974 | Blosser |
| 4,580,726 A * | 4/1986 | Unger ............... B60S 3/044 134/123 |
| 4,889,147 A | 12/1989 | Chandler |
| 4,984,746 A * | 1/1991 | Joyal ................ B60S 3/042 134/123 |
| 5,341,828 A | 8/1994 | Ferguson, Sr. |
| 5,707,014 A * | 1/1998 | Chan ............... B60S 3/042 239/722 |
| 5,820,037 A | 10/1998 | Lawrence |
| 6,055,994 A | 5/2000 | Decker |
| 6,131,831 A * | 10/2000 | Lawrence ........ B60S 3/044 239/722 |
| 6,247,658 B1 | 6/2001 | Bakas |
| 6,358,330 B1 | 3/2002 | McGraw |
| 7,111,631 B1 | 9/2006 | Breeze |

(Continued)

*Primary Examiner* — Steven J Ganey
(74) *Attorney, Agent, or Firm* — Doherty IP Law Group LLC

(57) ABSTRACT

A portable undercarriage washer for vehicles includes a spray manifold having a feed line with a proximal end and a distal end, a spray tube coupled with the distal end of the feed lines, and a plurality of spaced spray nozzles connected with spaced openings on the spray tube. A protective cover overlies the spray manifold and the spaced spray nozzles. The protective cover has a top surface, a bottom surface, a plurality of spaced openings extending between the top and bottom surfaces, and a recess formed in the bottom surface. The spacing between the spaced openings matches the spacing between the spaced spray nozzles. The protective cover has a height that is greater than or equal to the height of the spaced spray nozzles, and the protective cover has side walls that slope downwardly and outwardly between the top and bottom surfaces of the protective cover.

20 Claims, 23 Drawing Sheets

(56) References Cited

U.S. PATENT DOCUMENTS

| | | |
|---|---|---|
| 7,208,051 B2 * | 4/2007 | Zinski .................... B08B 3/024 239/722 |
| 7,591,605 B2 | 9/2009 | Jonasz et al. |
| 2006/0191561 A1 | 8/2006 | Mey et al. |
| 2007/0169796 A1 | 7/2007 | Johnson et al. |
| 2008/0029136 A1 | 2/2008 | Kondos |
| 2012/0012138 A1 | 1/2012 | Garrett |
| 2013/0213444 A1 | 8/2013 | Zabel |
| 2014/0102489 A1 | 4/2014 | Smith |

* cited by examiner

PORTABLE UNDERCARRIAGE WASHER FOR VEHICLES

BACKGROUND OF THE INVENTION

Field of the Invention

The present patent application is related to cleaning vehicles, and is more specifically related to washer systems for cleaning vehicle undercarriages.

Description of the Related Art

Vehicles such as trucks, construction equipment, farm equipment, automobiles, and lawn care machinery are often operated in off-road or snowy conditions. These vehicles tend to accumulate deposits, such as mud, dirt, ice, and salt, in undercarriages, which typically include the vehicle frame, the underside of the vehicle, underbody parts, and wheel wells. Failing to remove these deposits and debris can cause rusting and/or damage to the undercarriage and associated parts. As a result, many vehicle manufacturers recommend that the undercarriage and wheel well regions of vehicles be cleaned periodically to prevent rust.

There have been numerous attempts directed to cleaning the undercarriages of vehicles. For example, U.S. Patent Application Publication No. 2008/0213444 to Zabel discloses a lawn tractor washer including a water conduit having water outlet holes that are directed toward the underside of the lawn tractor. The water conduit is held by a frame that stabilizes the water conduit and directs the water outlet holes toward the underside of the lawn tractor.

U.S. Patent Application Publication No. 2006/0191561 to Mey et al. discloses an undercarriage carwash system for use in a self-serve carwash bay including a housing, a conduit with a plurality of nozzles, and a control. The carwash bay has a support surface upon which a vehicle is parked for washing the vehicle. The system discharges pressurized fluid via at least one spraying device to wash the vehicle. A housing is positioned on the support surface of the bay and entirely above the plane of the support surface. The conduit is positioned within the housing and is connected to the pressurized fluid system of the carwash bay. The nozzles are directed to discharge fluid from the pressurized fluid system of the carwash bay to an underside of a vehicle at the support surface of the bay.

U.S. Patent Application Publication No. 2008/0029136 to Kondos discloses an undercarriage washer that is adapted for use with a high-pressure washing fluid. The undercarriage washer includes a rigid tube and an angled inlet and an angled outlet. A skid plate is fixedly secured to the tube near the angled outlet end. The skid plate provides sufficient lateral support so that the discharge of high-pressure washing fluid does not rotate the washer stream. The non-vertical discharge angle permits cleaning of large undercarriage parts.

U.S. Pat. No. 3,795,254 to Blosser discloses a device for spraying water against a vehicle to remove harmful salt and chemicals deposited on the vehicle. A plurality of parallel spaced conduits rest on a surface beneath the vehicle and extend longitudinally therewith. The conduits are connected to a water header which, in turn, is connected to a supply of water. A pair of these conduits are located along the outer sides of the vehicle and a plurality of these conduits are located underneath the vehicle between the front and rear wheels. A plurality of spray holes are formed in the upper portions of the outer conduits at various angles for spraying water against the sides of the vehicle at various heights. A plurality of spray holes are formed in the upper portions of the inner conduits at various angles for spraying water in various directions against the underside portions of the vehicle.

U.S. Pat. No. 7,111,631 to Breeze discloses a portable flushing apparatus for motor vehicles including a source of water, a pump for pressurizing the water, and a conduit having a plurality of water outlet apertures positioned horizontal to the undercarriage. The portable spraying apparatus has spaced apart conduits under the vehicle to produce a vigorous spray at the undercarriage. The conduit is positioned parallel to the vehicle having conduit positioned adjacent the vehicle with risers for cleaning the exterior sides and wheel wells and under the vehicle with multiple apertures positioned to deliver a spray from 90 to 30 degrees relative to the horizontal. Positioned within the conduit and forming an integral part therewith is at least one connective member having threaded distal ends whereby rotation of one member relative to another can occur to compensate for uneven ground.

U.S. Patent Application Publication No. 2012/0012138 to Garrett discloses a wash station that sprays water onto a vehicle traversing the station to remove debris. The wash station includes an elongated frame with folding ramps at each end and a hollow longitudinal tube on one frame end that provides internal fluid communication to spray ports in the frame. A grate spanning the frame supports the vehicle during station traversal and vibrates the vehicle as it traverses the station to remove debris therefrom. An entry port in the frame receives remote water for the spray ports that selectively discharge the water to remove trapped debris from the station and into a suitable containment area or collection tray.

U.S. Patent Application Publication No. 2014/0102489 to Smith discloses a truck wash apparatus with a frame having fluid bearing members adapted to support a truck above a support surface. The fluid bearing members include a left and right pair of longitudinal members and multiple crossmembers. The frame members define the walls configured to carry a wash fluid, and to also support a truck above a support surface. The frame has tire engaging tire support members that are adapted to engage the inner walls of each of the left and right pairs of longitudinal members. A left side rail and a right side rail in fluid communication with the frame are provided for location outside of and above the left and right pair of spaced apart longitudinal members. The side rails are adapted to carry wash fluid. The apparatus includes nozzles that spray the wash fluid at the vehicle.

U.S. Patent Application Publication No. 2007/0169796 to Johnson et al. discloses a vehicle undercarriage washing apparatus for use on vehicles such as tractor trailers, buses, dump trucks, and medium to heavy duty trucks and equipment. The apparatus has a frame to which are attached a pair of spray devices that rotate. The apparatus is intended for heavy duty, high pressure high temperature environments such as for use by commercial transportation fleets that require the removal of grease, oil, fuel, dirt, mud, salt or other like contaminants from undercarriages. The apparatus is mounted on wheels that enable the apparatus to be rolled under vehicles.

U.S. Pat. No. 7,208,051 to Zinski et al. discloses an underbody car wash for home use that can be connected to a garden hose or a pressure washer. The device utilizes a three nozzled "I" design, supported by four swiveling casters. The device has an ergonomically effective wand system to allow easy maneuverability under the vehicle. The spray pattern of the "I" design along with its maneuverability allows the consumer to access and remove sediment adhesions to the vehicle underbody while controlling water flow at all times with a trigger spray gun.

U.S. Pat. No. 5,820,037 to Lawrence discloses a portable automobile undercarriage washer including an inverted bowl-like body portion having a water spray nozzle on a top face, a connection for a rigid, non-flexible water pipe on the side of the body, and casters underneath the body. When connected to a standard garden-type hose, the washer generates a pressurized water spray pattern capable of being delivered to the undercarriage of an automobile, or other wheeled vehicle, for removing accumulated mud or road salt from the undercarriage of the vehicle.

In spite of the above advances, many of the above-described undercarriage washers are stationary systems that are fixed in place and cannot be easily moved from one location to another. Furthermore, many of the above-described systems may be used in a limited number of locations, such as a vehicle bay having a concrete floor. In addition, many of the above-described washer systems require the driver to exit the cab to wash the undercarriage, and may result in the driver being sprayed with the washer fluid. Moreover, none of the above systems provide tactile feedback to the driver that confirms that the left-most sections and right-most sections of the undercarriage have been cleaned.

Thus, there remains a need for improved undercarriage washers for vehicles that are portable, versatile, eliminate the need for the driver to exit the cab to confirm cleaning, eliminate the possibility that the driver will be sprayed with the washer fluid, and that provide tactile feedback that full cleaning of the undercarriage has occurred.

SUMMARY OF THE INVENTION

In one embodiment, a portable undercarriage washer for vehicles preferably includes a spray manifold including a plurality of spaced spray nozzles, and a protective cover having a top surface with a plurality of spaced openings, the protective cover overlying the spray manifold and the spaced spray nozzles. The spacing between the spaced openings desirably matches the spacing between the spaced spray nozzles so that the spaced spray nozzles are aligned with the spaced openings. The top surface of the protective cover preferably defines a height that is greater than or equal to the height of the spaced spray nozzles. The protective cover has side walls that slope downwardly and outwardly from the top surface of the protective cover to a bottom surface of the protective cover.

In one embodiment, the portable undercarriage washer including the spray manifold and the protective cover is placed on the ground and connected with a source of washer fluid such as a high pressure washer. Upon activation, the washer fluid is sprayed from the spaced spray nozzles. In one embodiment, the washer fluid is under high pressure as it is sprayed from the spaced spray nozzles.

In one embodiment, the nozzles may be readily changed for altering the spray angle of the sprayed washer fluid. For example, a first set of spray nozzles that generate a 15 degree spray angle may be removed from the spray manifold and replaced with a second set of spray nozzles that generate a 25 degree spray angle. The spray nozzles may be quick connect/disconnect spray nozzles or may be threadably connected to the spray manifold.

In one embodiment, the portable undercarriage washer has different sets of spray nozzles, whereby each set generates a spray pattern having a unique spray angle. In one embodiment, the unique spray angles for the sets of the spray nozzles may include spray patterns that diverge at 15 degrees, 25 degrees, 45 degrees, and/or 65 degrees.

The protective cover and the spray manifold are assembled together during a cleaning operation. Although the present invention is not limited by any particular theory of operations, the protective cover is designed to protect the spray nozzles from being damaged by vehicle tires if the vehicle tires roll over the protective cover, and to provide tactile feedback to the driver when a vehicle wheel strikes and/or rolls over one of the sloping side walls of the protective cover. As a result, a driver may determine that the left-most section and the right-most section of the undercarriage have been cleaned by the spray from the undercarriage washer without requiring the driver to exit the cab. The sloping side walls enable the driver to receive a gentler level of tactile feedback than could be attained if more vertically arrayed side walls were utilized.

In one embodiment, the spray manifold preferably includes a feed line having a proximal end and a distal end, and a spray bar connected with the distal end of the feed line, the spray bar having spaced openings extending along the length thereof. In one embodiment, each spaced spray nozzle is connected to one of the spaced openings on the spray bar. In one embodiment, the spray bar and the feed line form a T-shaped structure with the spray bar forming the top, horizontal component of the T and the feed line forming the lower, vertical component of the T. The spaced spray nozzles are detachably secured to the spaced openings on the spray bar so that they may be easily removed and replaced with spray nozzles having different parties.

In one embodiment, the spray manifold desirably includes a support plate having a top surface, whereby the feed line and the spray tube are attached to the top surface of the support plate. In one embodiment, the support plate may be flat and the protective cover is positioned over the flat support plate.

In one embodiment, the spaced openings in the protective cover extend from the top surface to the bottom surface of the protective cover. When the protective cover overlies the support plate, the top surface of the support plate preferably opposes the bottom surface of the protective cover.

In one preferred embodiment, the bottom surface of the protective cover desirably has a recess formed therein. The protective cover desirably overlies the support plate with the support plate, the spray tube, and the feed line disposed in the recess formed in the bottom surface of the protective cover.

In one embodiment, the protective cover overlies the spray manifold with the spray tube and the feed line disposed in the recess formed in the bottom surface of the protective cover. In one embodiment, the spray tube and the feed line desirably form a friction fit with the recess formed in the bottom surface of the protective cover.

In one embodiment, the spray manifold and the protective cover are held together by a friction fit.

In one embodiment, a portable undercarriage washer for vehicles desirably includes a spray manifold with a feed line having a proximal end and a distal end, a spray tube connected with the distal end of the feed line, and a plurality of spaced spray nozzles connected with spaced openings on the spray tube. A protective cover desirably overlies the spray manifold and the spaced spray nozzles. The protective cover has a top surface, a bottom surface, a plurality of spaced openings extending between the top and bottom surfaces, and a recess formed in the bottom surface. The spacing between the spaced openings desirably matches the spacing between the spaced spray nozzles. The protective cover preferably has a height that is greater than or equal to the height of the spaced spray nozzles. The protective cover desirably has side walls that slope downwardly and outwardly from the top surface of the protective cover to the bottom surface of the protective cover.

In one embodiment, the feed line and the spray tube of the spray manifold are disposed in the recess formed in the bottom surface of the protective cover. In one embodiment, the feed line and the spray tube of the spray manifold form a friction fit with the recess formed in the bottom surface of the protective cover.

In one embodiment, the spaced spray nozzles are desirably disposed in the respective spaced openings of the protective cover, and the protective cover has a height that is greater than the height of the spaced spray nozzles so that the spaced spray nozzles are below the top surface of the protective cover.

The protective cover is desirably made of rugged material that may withstand being driven over by the wheels of the vehicle, and that will protect the spray nozzles positioned within the spaced openings of the protective cover. The protective cover may be made of rubber, molded rubber, polymers, metal, plastic, and/or wood.

In one embodiment, the top surface of the protective cover preferably has a dome shape and the sloping slide walls include a front sloping slide wall, a rear sloping side wall, and a pair of lateral sloping side walls. The sloping side walls desirably extend from the top surface to the bottom surface of the protective cover.

In one embodiment, the recess formed in the bottom surface extends to a notch provided at a rear edge of the protective cover, and the feed line projects through the notch and from the rear sloping side wall for being connected with a washer fluid supply line, which, in turn, is connected to a source of washer fluid such as a pressure washer.

In one embodiment, the quick attach wheels may be connected with the spray manifold so that the spray manifold may be rolled under a vehicle for washing the undercarriage. In this embodiment, the spray manifold may be separated from its assembly with the protective cover when being used with the roller wheels. In one embodiment, the wheels may be connected to the spray manifold for use when the spray manifold is assembled with the protective cover. The wheel embodiment preferably provides for a broader array of uses for the undercarriage washer.

These and other preferred embodiments of the present invention will be described in more detail below.

DETAILED DESCRIPTION

Figure 1:
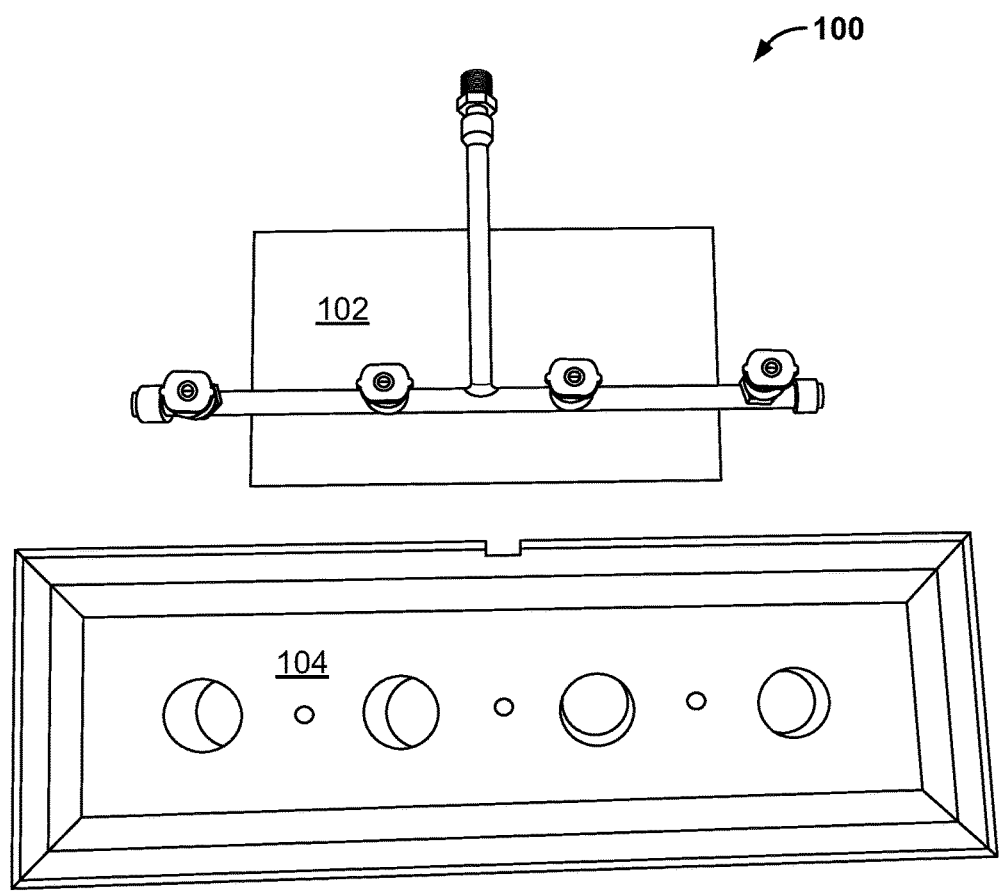
FIG. 1 shows a top plan view of a portable undercarriage washer for vehicles including a spray manifold and a protective cover, in accordance with one embodiment of the present invention.

Referring to FIG. 1, in one embodiment of the present invention, a portable undercarriage washer 100 for vehicles preferably includes a spray manifold 102 and a protective cover 104 that is adapted to cover and protect the spray manifold 102 from being damaged when vehicle tires roll over the protective cover.

Figure 2:
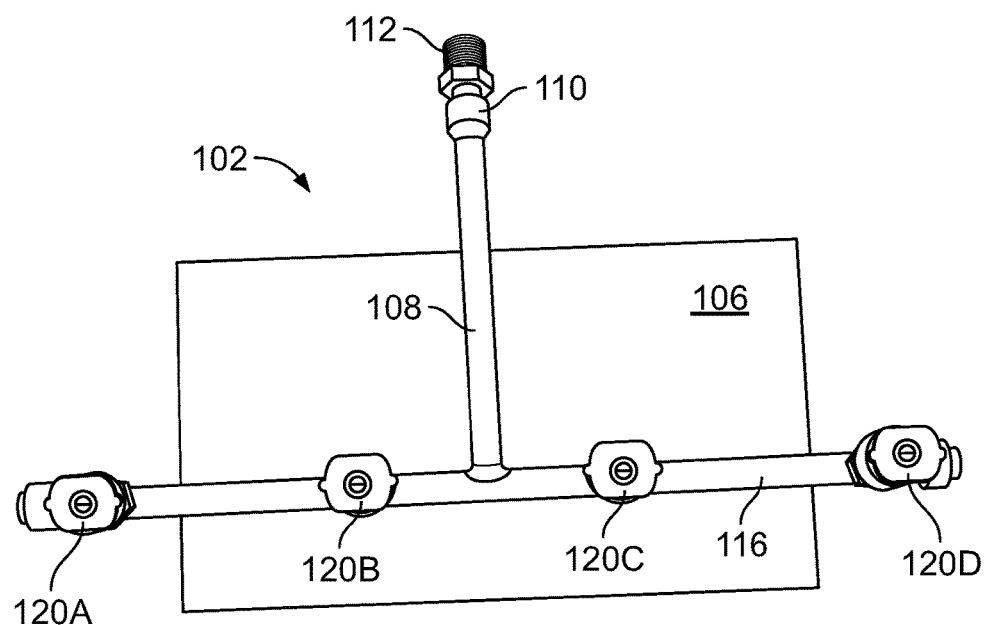
FIG. 2 shows a top plan view of the spray manifold of FIG. 1, in accordance with one embodiment of the present invention.
Figure 3:
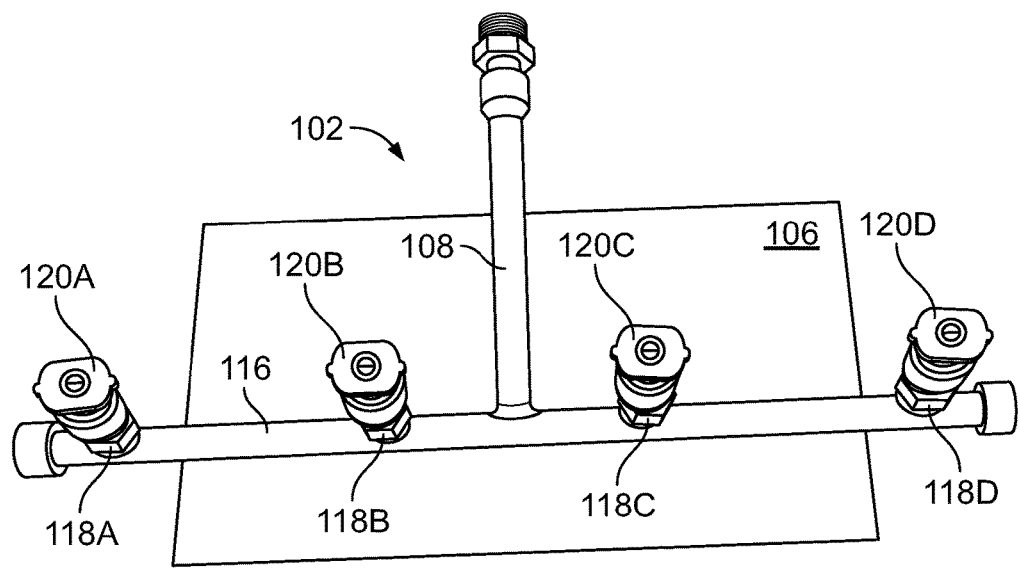
FIG. 3 shows a perspective view of the spray manifold of FIG. 1.

Referring to FIGS. 2 and 3, in one embodiment, the spray manifold 102 preferably includes a support plate 106, a feed line 108 with a proximal end 110 having a connector 112 and a distal end 114 in fluid communication with a spray bar 116. In turn, the spray bar 116 has a series of spaced spray openings 118A-118D (FIG. 3) that are adapted to receive spray nozzles 120A-120D. In one embodiment, the support plate 106 is a flat support plate that may be placed on the ground, such as on the ground of a motor pool, a vehicle bay, the ground, or a parking lot. In one embodiment, the spray nozzles 120A-120D may be disconnected and replaced to provide spray patterns having different angles of divergence (e.g., 15 degrees, 25 degrees, 45 degrees, and 65 degrees). In one embodiment, the spray nozzles are quick connect/disconnect spray nozzles that enable an operator to easily and rapidly change the spray nozzles, if necessary. For example, spray nozzles that generate a 25 degree spray pattern many be removed and replaced with spray nozzles that generate a 15 degree spray pattern.

Figure 4:
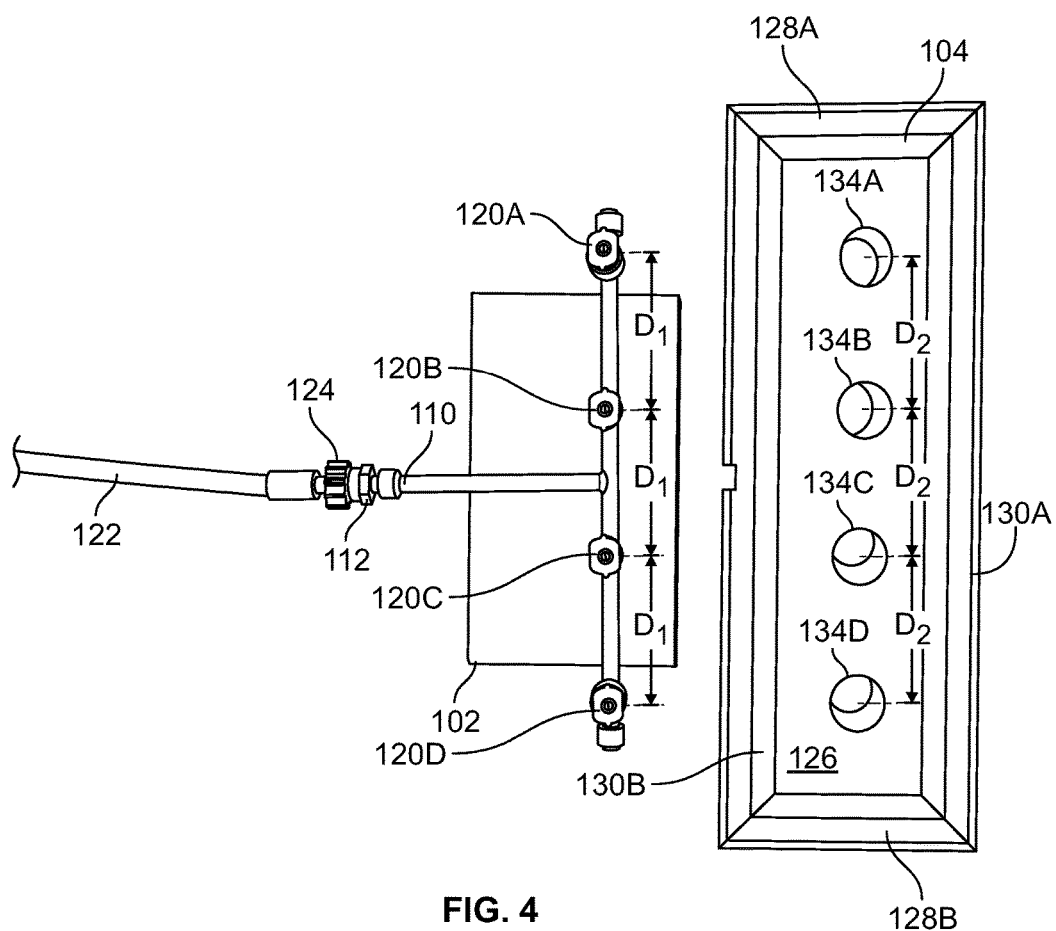
FIG. 4 shows the spray manifold and the protective cover of FIG. 1 and a high pressure line connected with the spray manifold.

Referring to FIG. 4, in one embodiment, a washing fluid supply line 122 from a water source, a power washer, or a compressor is connected with the connector 112 at the proximal end 110 of the feed line 108 to provide washer fluid (e.g., high pressure water) to the feed line. In one embodiment, the distal end of the washer fluid supply line 122 has a female threaded connector 124 that is preferably threaded onto a male threaded connector 112 at the proximal end 110 of the feed line 108. The connector may also be a quick connect/disconnect connector.

In one embodiment, the spray nozzles 120A-120D on the spray manifold 102 are spaced a distance $D_1$ of about 4-6 inches from one another. The above-identified spacing and number of spray nozzles are merely exemplary in nature and may be modified and still fall within the scope of the present invention.

In one embodiment, the protective cover 104 preferably has a top surface 126, a pair of sloping end walls 128A, 128B, a sloping front wall 130A, and a sloping rear wall 130B. In one embodiment, the top surface 126 is flat and the sloping walls 128A, 128B, 130A, and 130B slope downwardly and outwardly between the top surface and an outer perimeter 132 at the base (e.g., the bottom surface) of the protective cover 104. The protective cover 104 desirably has spaced openings 134A-134D having respective centers that are spaced a distance $D_2$ from one another that matches the spacing $D_1$ of the spray nozzles 120A-120D. In one embodiment, when the protective cover 104 is positioned over the spray manifold 102, the spray nozzles 120A-120D are positioned within the respective spaced openings 134A-134D of the protective cover 104.

Figure 5:
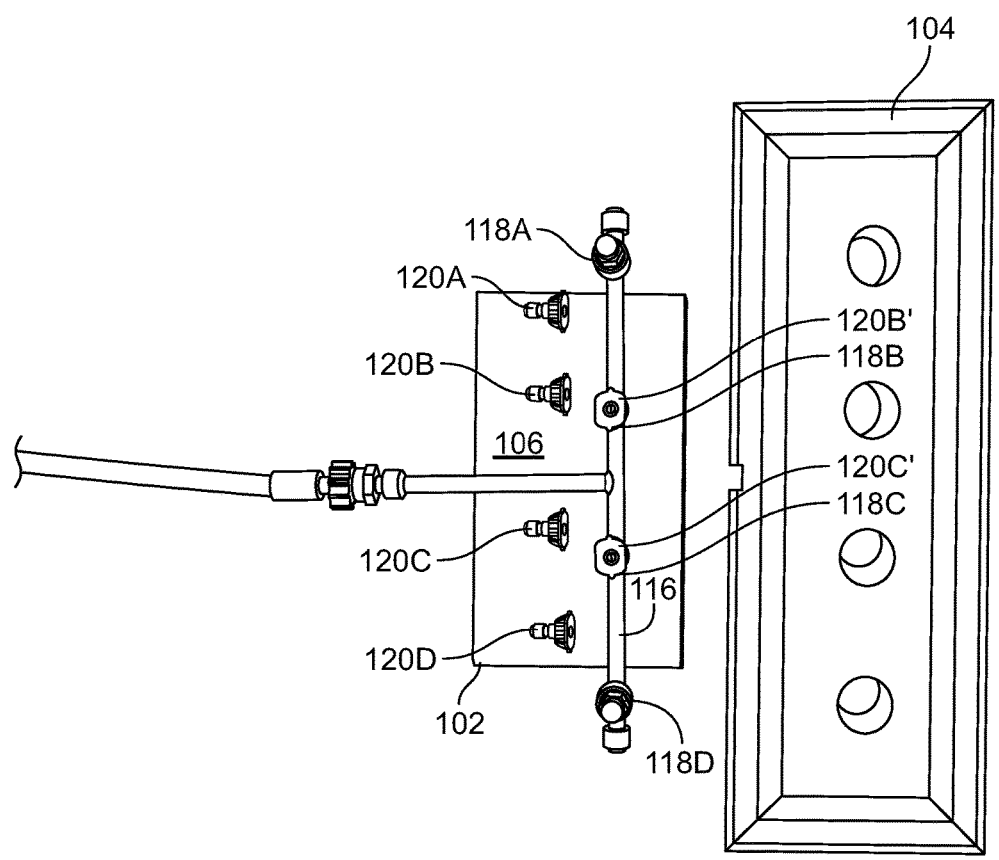
FIG. 5 shows a spray manifold having interchangeable nozzles, in accordance with one embodiment of the present invention.

Referring to FIG. 5, in one embodiment, the portable undercarriage washer 100 preferably includes interchangeable spray nozzles. In FIG. 5, two spray nozzles 120B' and 120C' are connected with the spray bar 116. Replacement spray nozzles 120A-120D having different spray properties are positioned atop the support plate 106 of the spray manifold 102. In order to change the spray pattern generated by the spray manifold, the two spray nozzles 120B', 120C' may be disconnected from the spray bar 116 and the replacement spray nozzles 120A-120D may be connected with the female openings 118A-118D or connection points provided on the spray bar.

Figure 6:
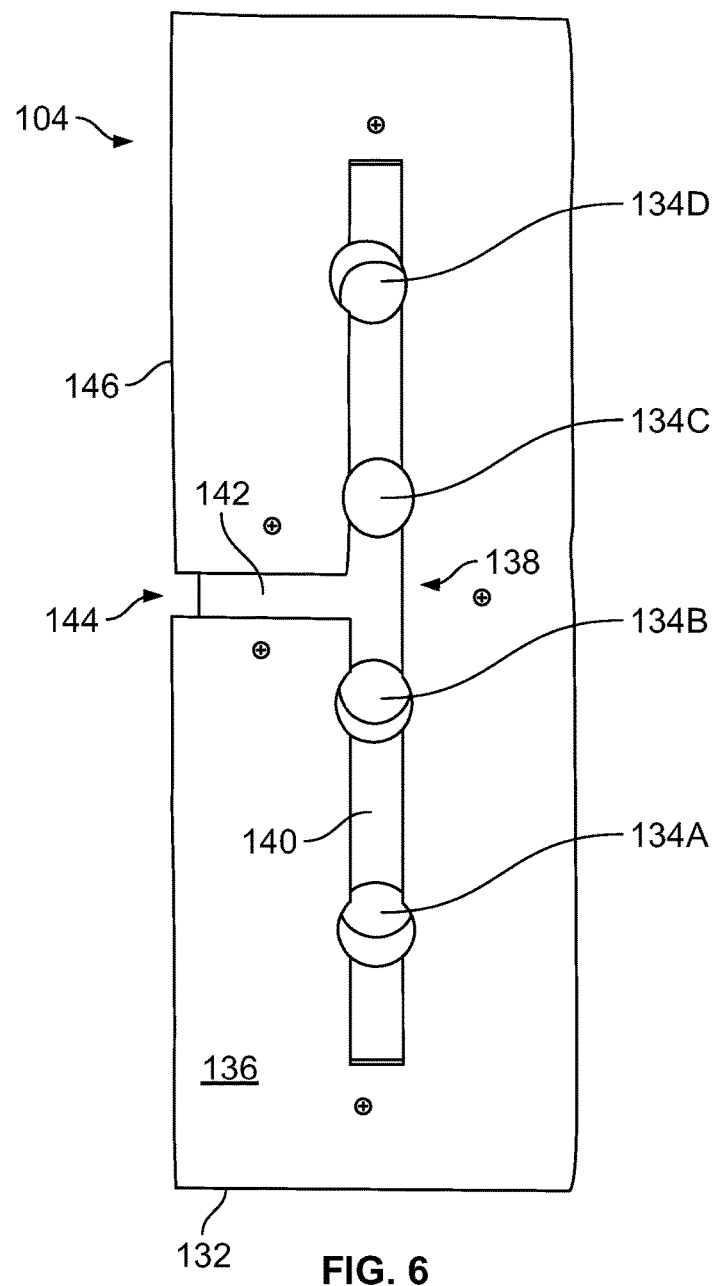
FIG. 6 shows a bottom view of the protective cover shown in FIG. 1.

Referring to FIG. 6, in one embodiment, the protective cover 104 has a bottom surface 136 that extends to the outer perimeter 132 of the cover. In one embodiment, the bottom surface 136 is desirably flat. In one embodiment, a recess 138 is formed in the bottom surface 136 of the protective cover 104. The recess 138 preferably has a longer section 140 that extends along the length of the protective cover 104 and that intersects the spaced openings 134A-134D, and a short section 142 that intersects the longer section 140 between the spaced openings 134B, 134C. The shorter section 142 preferably extends to the perimeter 132 of the protective cover 104 at the rear edge of the protective cover to define a notch 144 that opens at the rear or trailing side wall 146 of the cover.

Figure 7:
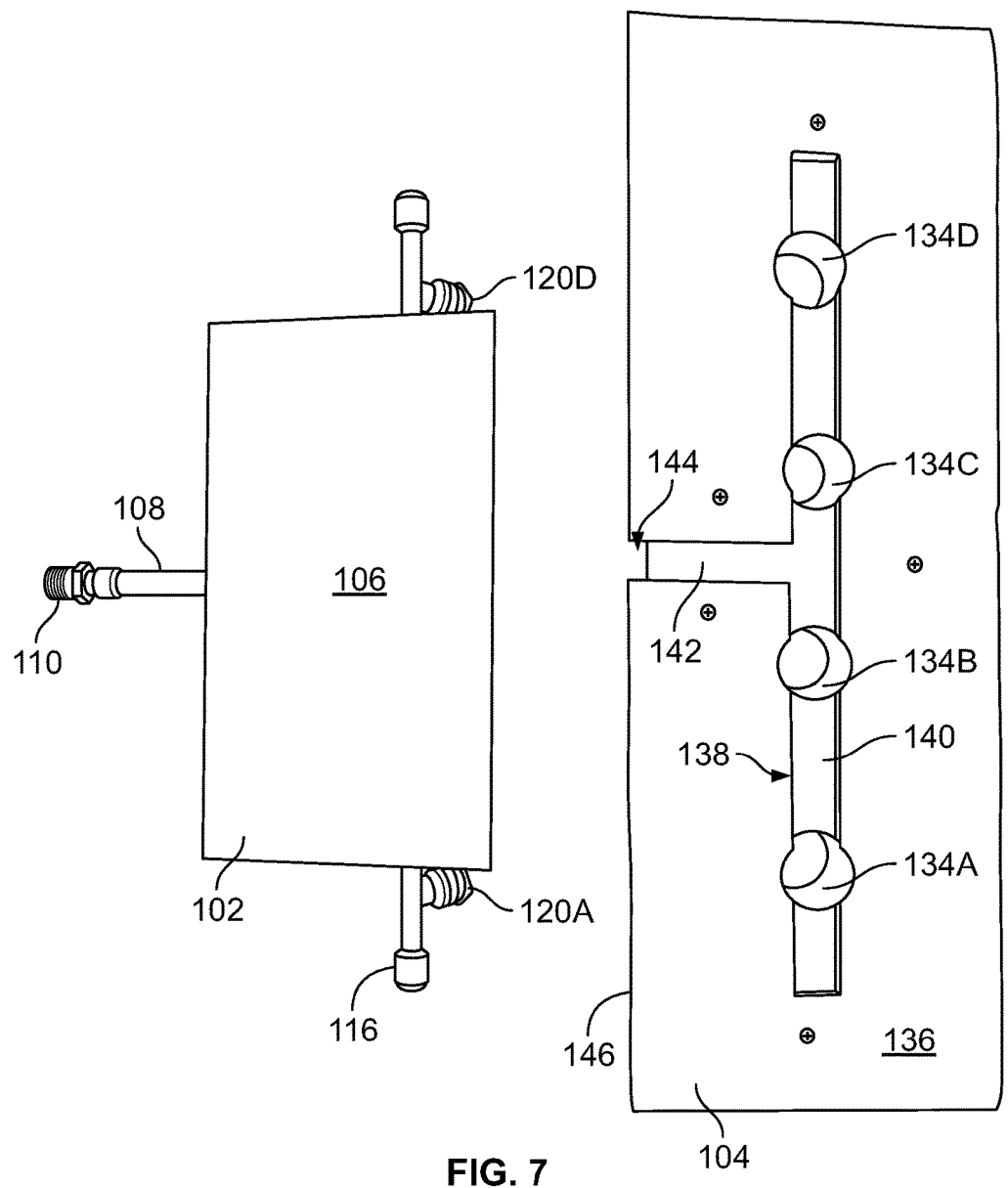
FIG. 7 shows a bottom view of the protective cover and the spray manifold of FIG. 1.
Figure 8:
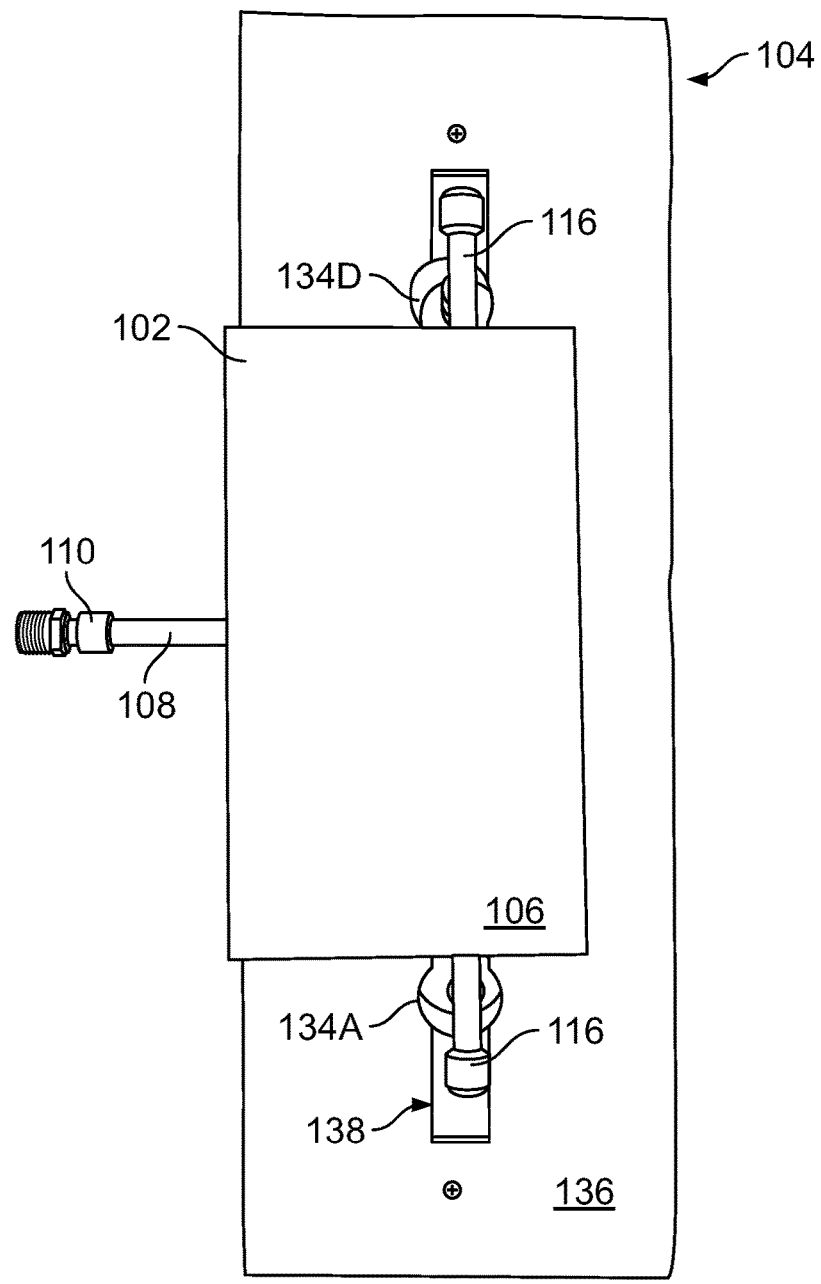
FIG. 8 shows the spray manifold of FIG. 7 inserted into a recess formed in the bottom of the protective cover of FIG. 7.

Referring to FIGS. 7 and 8, in order to assemble the spray manifold 102 with the protective cover 104, the support plate 106 of the spray manifold is aligned with a center of the protective cover. As the protective cover is placed over the spray manifold, the spray nozzles 120A-120D are inserted into the respective spaced openings 134A-134D of the protective cover 104 and the spray bar 116 is inserted into the longer section 140 of the recess 138. The feed line 108 is desirably inserted into the shorter section 142 of the recess 138 with the proximal end 110 of the feed line 108 projecting from the notch 144 that opens at the trailing side wall 146 of the protective cover 104. In one embodiment, the spray bar 116 and the feed line 108 desirably form a friction fit with the recess 138 formed in the bottom surface 136 of the protective cover 104 for holding the protective cover and the spray manifold together. The spray bar and the feed line may have a slightly larger outer dimensions that the inner dimension of the recess to form the friction fit.

In one embodiment, the support plate 106 has a flat top surface that conforms to the flat bottom surface 136 of the protective cover 104 to minimize the height of the portable undercarriage washer and to facilitate positioning the washer in a stable configuration on the ground.

Figure 9A:
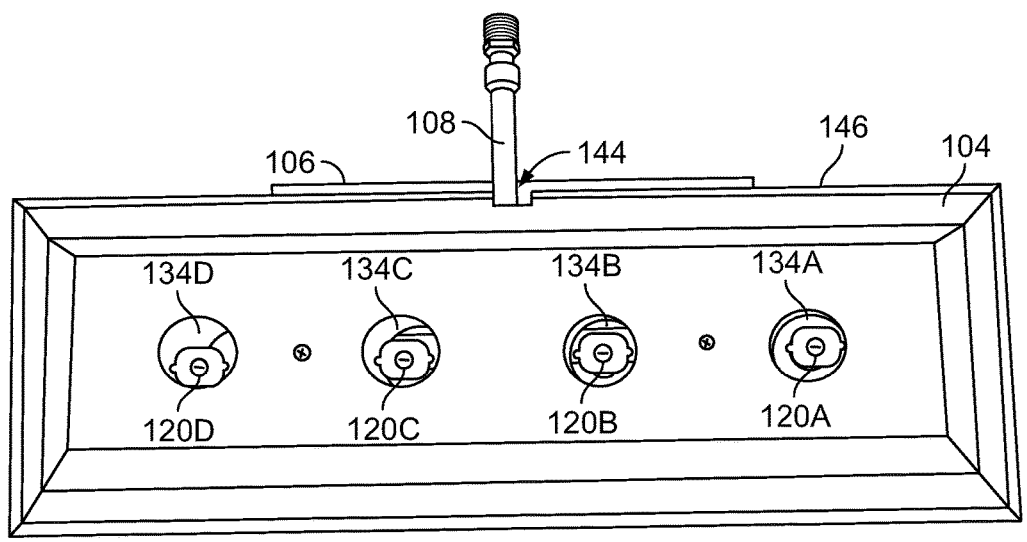
FIG. 9A shows a top plan view of the spray manifold and the protective cover shown in FIG. 8.
Figure 9B:
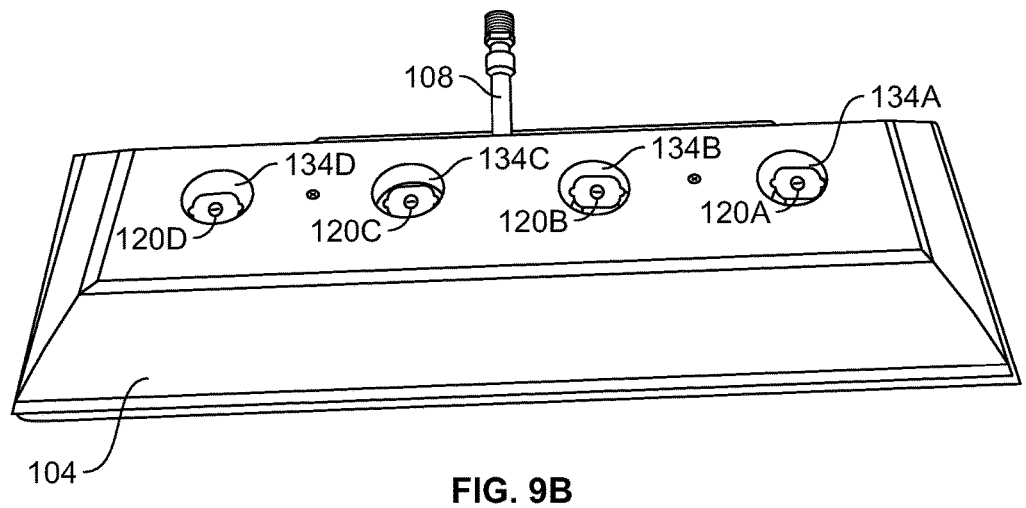
FIG. 9B shows a front perspective view of the spray manifold and the protective cover shown in FIG. 9A.
Figure 9C:
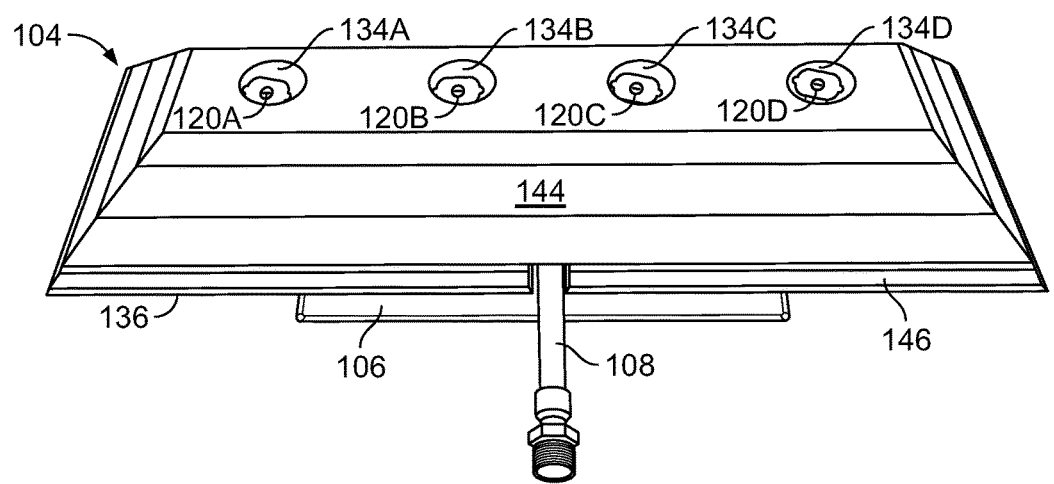
FIG. 9C shows a rear perspective view of the spray manifold and the protective cover shown in FIG. 9B.

Referring to FIGS. 9A-9C, in one embodiment, when the protective cover 104 is assembled with the spray manifold 102 (FIG. 7), the spray nozzles 120A-120D are positioned within the spaced openings 134A-134D of protective cover 104. The support plate 106 of the spray manifold 102 opposes the bottom surface 136 (FIG. 7) of the protective cover 104. The feed line 108 projects through the notch 144 formed in the rear sloping wall 146 of the protective cover 104 for being connected with a washing fluid supply line (not shown).

Figure 10:
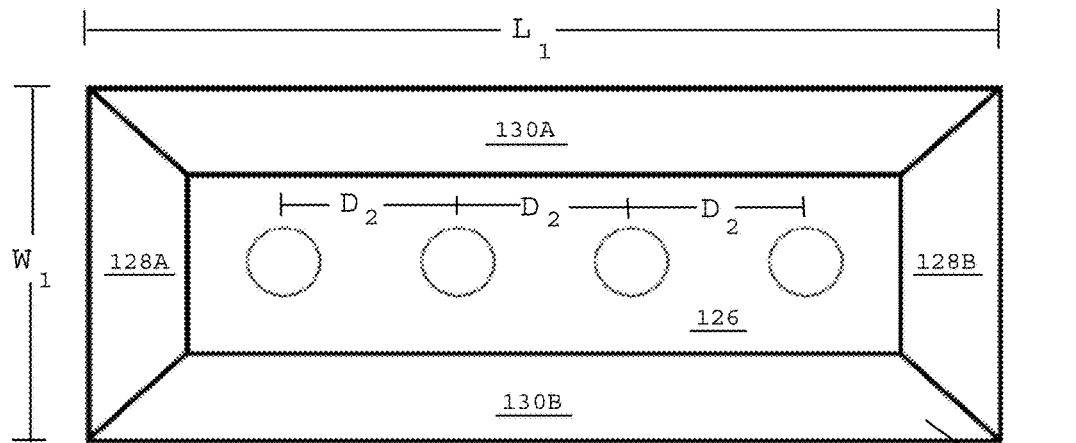
FIG. 10 shows a top plan view of the protective cover for a portable undercarriage washer, in accordance with one embodiment of the present invention.

Referring to FIG. 10, in one embodiment, the protective cover 104 has a top surface 126, an outer perimeter 136, and sloping side walls 128A, 128B, 130A, 130B that slope downwardy and outwardly between the top surface 126 and the outer perimeter 136. The protective cover 104 preferably has spaced openings 134A-134D that are spaced from one another along the length of the cover 104. In one embodiment, the protective cover 104 has a length $L_1$ of about 1-3 feet and a width $W_1$ of about 0.5-1.5 feet and more preferably about one foot.

Figure 11A:
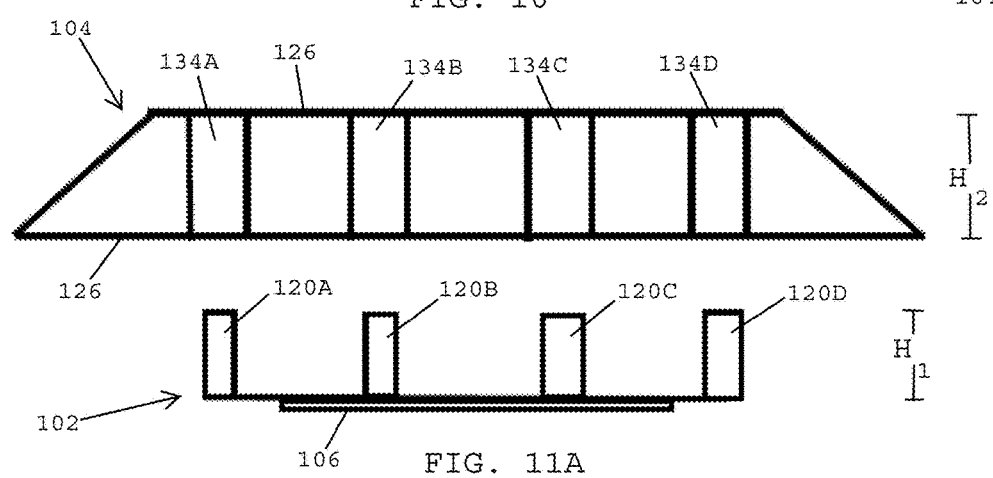
FIG. 11A shows a front cross-sectional view of a spray manifold and a protective cover of a portable undercarriage washer, in accordance with one embodiment of the present invention.

Referring to FIG. 11A, in one embodiment, the support plate 106 of the spray manifold 102 is placed over a surface S with the spray nozzles 120A-120D projecting away from the surface S. The bottom surface 126 of the protective cover 104 is juxtaposed with the top surface of the spray manifold, and the spaced openings 134A-134D of the protective cover 104 are aligned with the spaced spray nozzles 120A-120D.

Figure 11B:
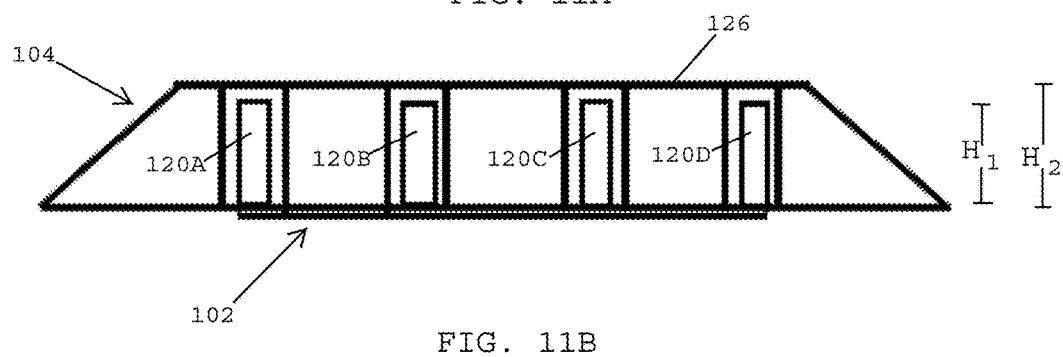
FIG. 11B shows another front cross-sectional view of the spray manifold and the protective cover of FIG. 11A after the elements have been coupled together.
Figure 12A:
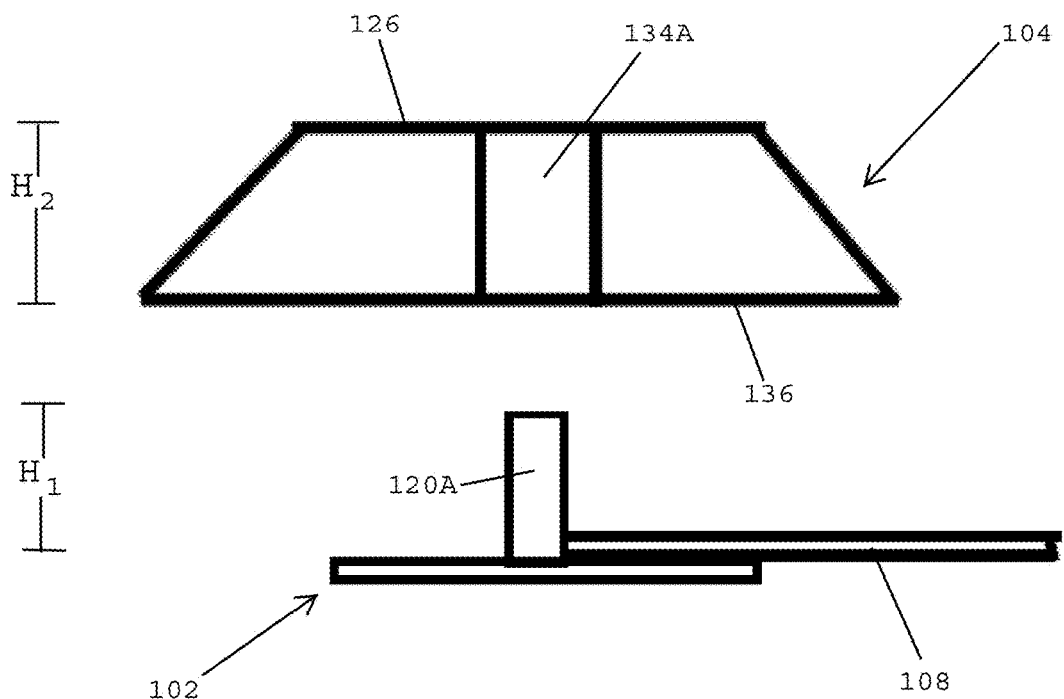
FIG. 12A shows a side cross-sectional view of a spray manifold and a protective cover of a portable undercarriage washer, in accordance with one embodiment of the present invention.
Figure 12B:
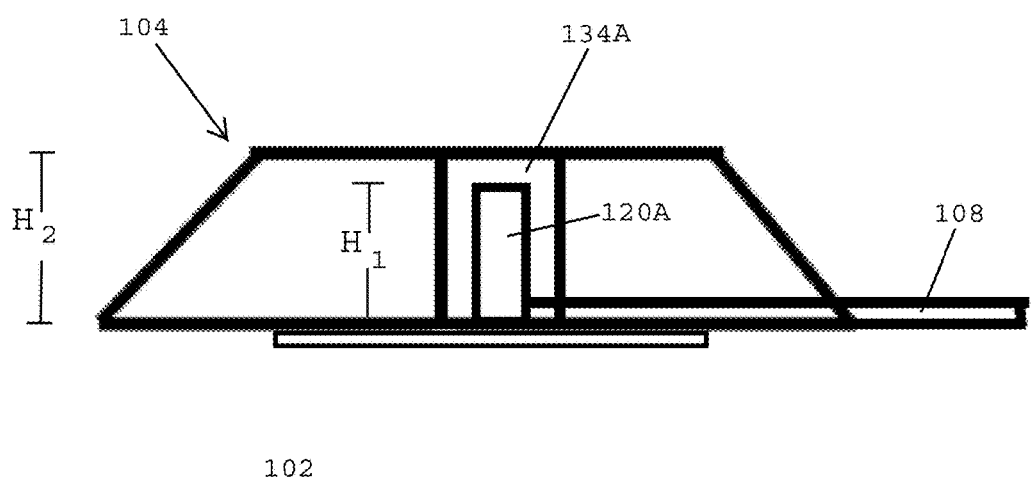
FIG. 12B shows another side cross-sectional view of the spray manifold and the protective cover of FIG. 12A after the elements have been coupled together.

In one embodiment, the spray nozzles 120A-120D have a height $H_1$ that is less than the height $H_2$ of the protective cover 104. Referring to FIGS. 11B and 12A-12B, when the protective cover 104 and the spray manifold 102 are assembled together, the shorter spray nozzles 120A-120D having the height $H_1$ are below the top surface 126 of the protective cover for being protected within the spaced openings 134A-134D of the protective cover 104 having a height $H_2$. As a result, the greater height $H_2$ of the protective cover 104 shields and protects the spray nozzles 120A-120D from damage that may occur when vehicle tires roll over the top of sloping side walls of the protective cover 104.

Referring to FIGS. 12A and 12B, the feed line 108 of the spray manifold 102 projects through the notch and the recess formed in the bottom surface 136 of the protective cover 104.

Figure 13:
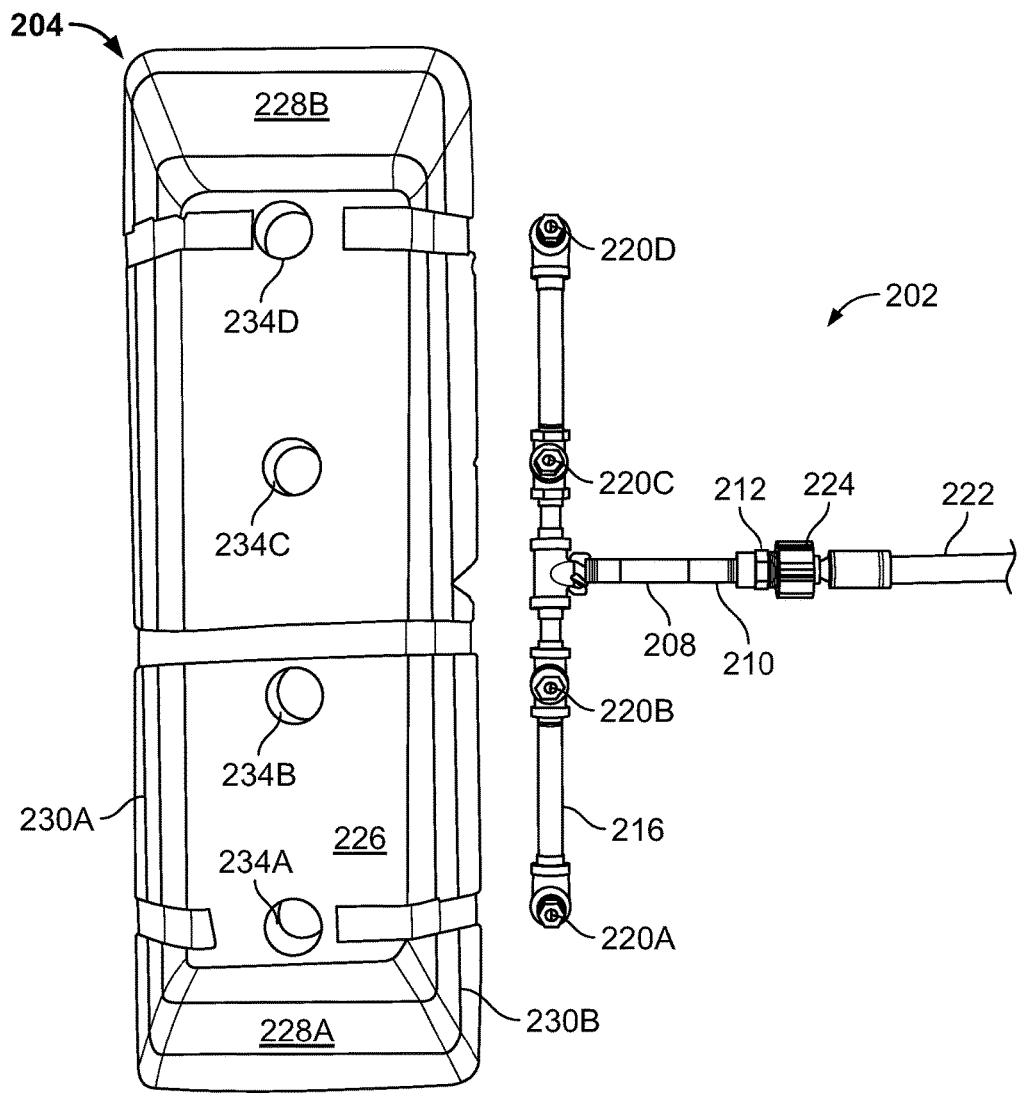
FIG. 13 shows a top plan view of a portable undercarriage washer including a spray manifold and a protective cover, in accordance with one embodiment of the present invention.
Figure 14:
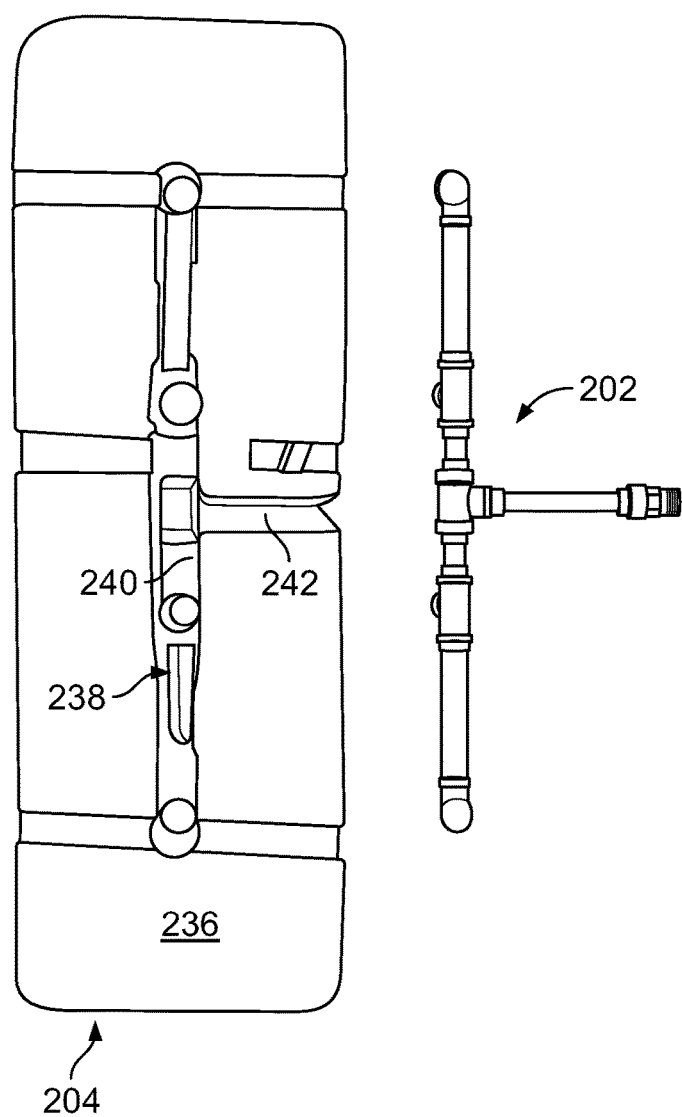
FIG. 14 shows a bottom view of the spray manifold and the protective cover of FIG. 13.
Figure 15:
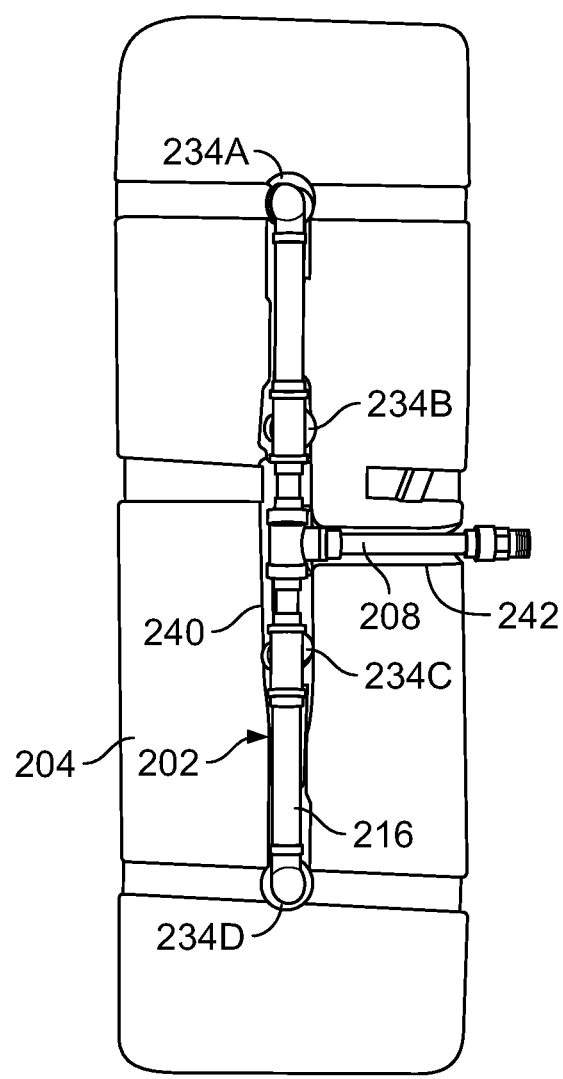
FIG. 15 shows the spray manifold and the protective cover of FIG. 14 after the spray manifold has been inserted into a recess formed in the bottom of the protective cover.
Figure 16:
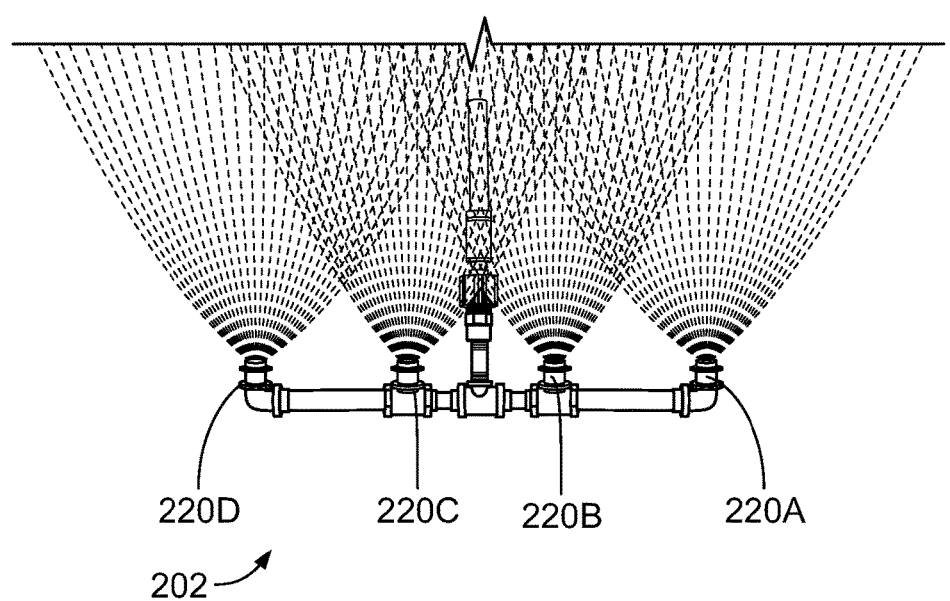
FIG. 16 shows a front perspective view of the spray manifold of FIG. 13 while spraying water from spray nozzles.
Figure 17:
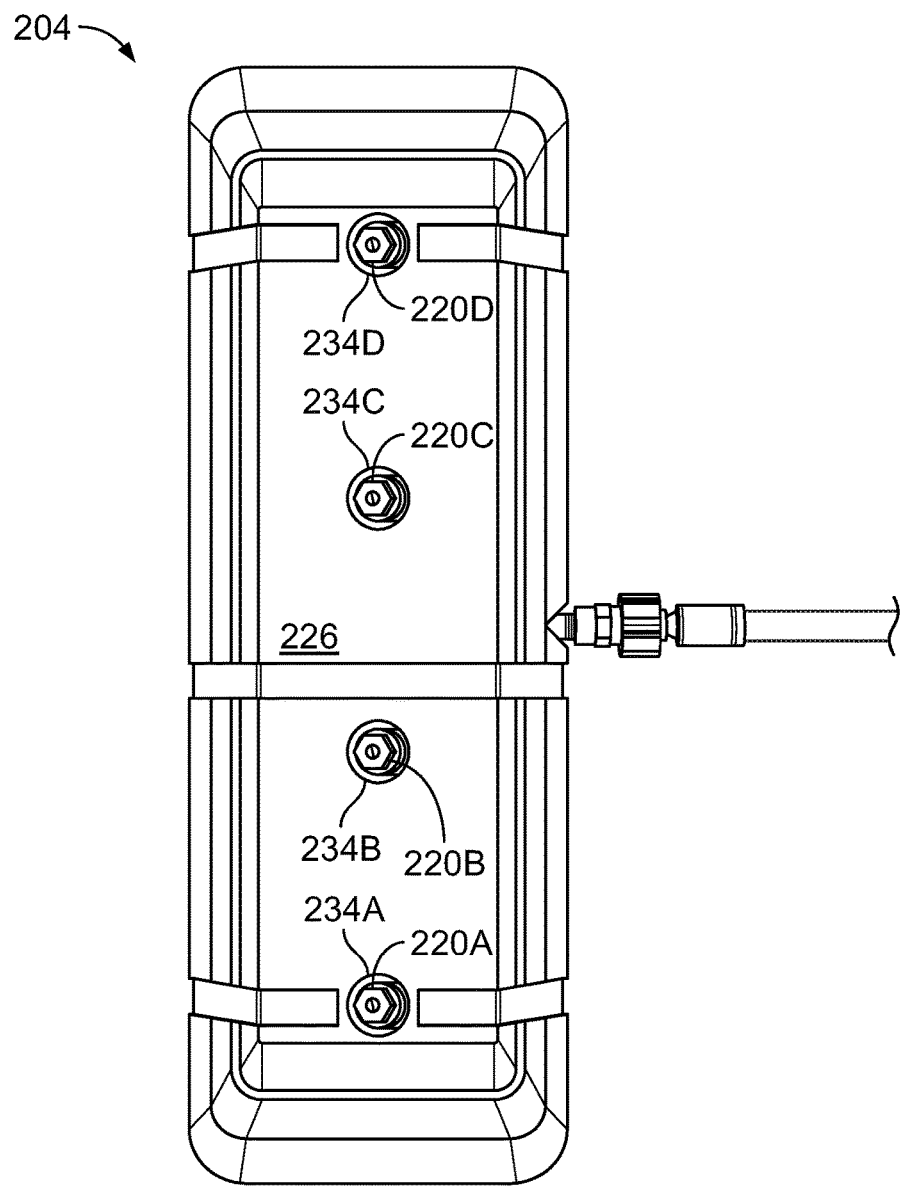
FIG. 17 shows a top plan view of the spray manifold of FIG. 13 assembled with the protective cover of FIG. 13.
Figure 18A:
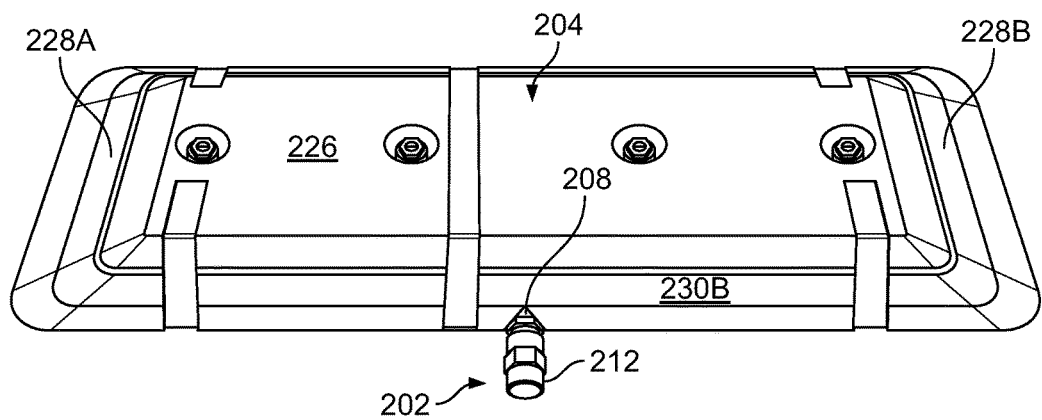
FIG. 18A shows a rear perspective view of the spray manifold and the protective cover of FIG. 17.
Figure 18B:
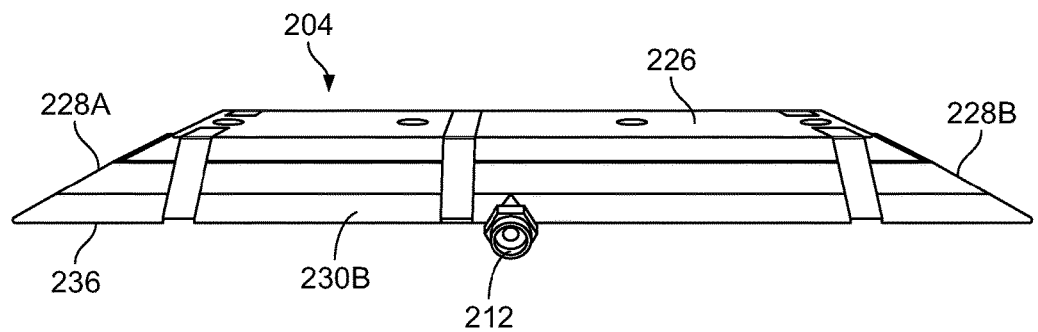
FIG. 18B shows a rear elevation view of the spray manifold and the protective cover of FIG. 18A.
Figure 19A:
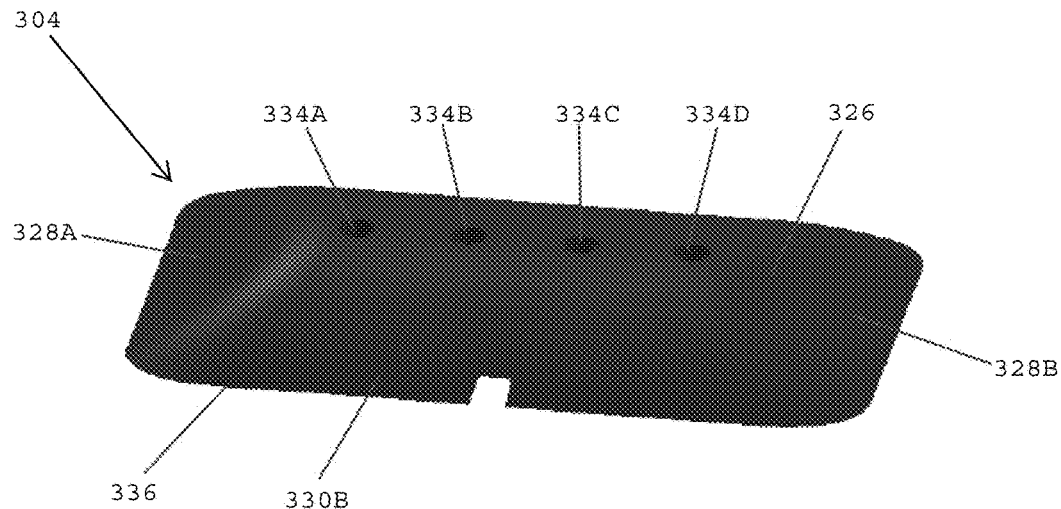
FIG. 19A shows a perspective view of a protective cover for a portable undercarriage washer, in accordance with one embodiment of the present invention.
Figure 19B:
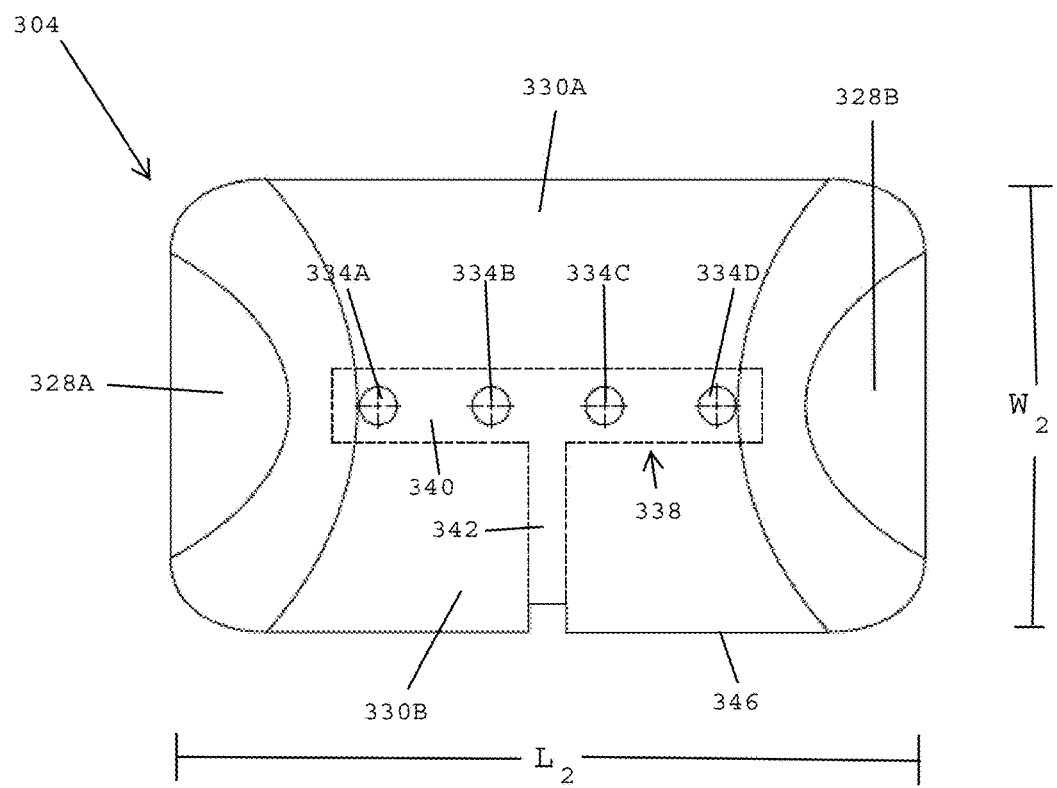
FIG. 19B shows a top plan view of the protective cover of FIG. 19B.
Figure 20A:
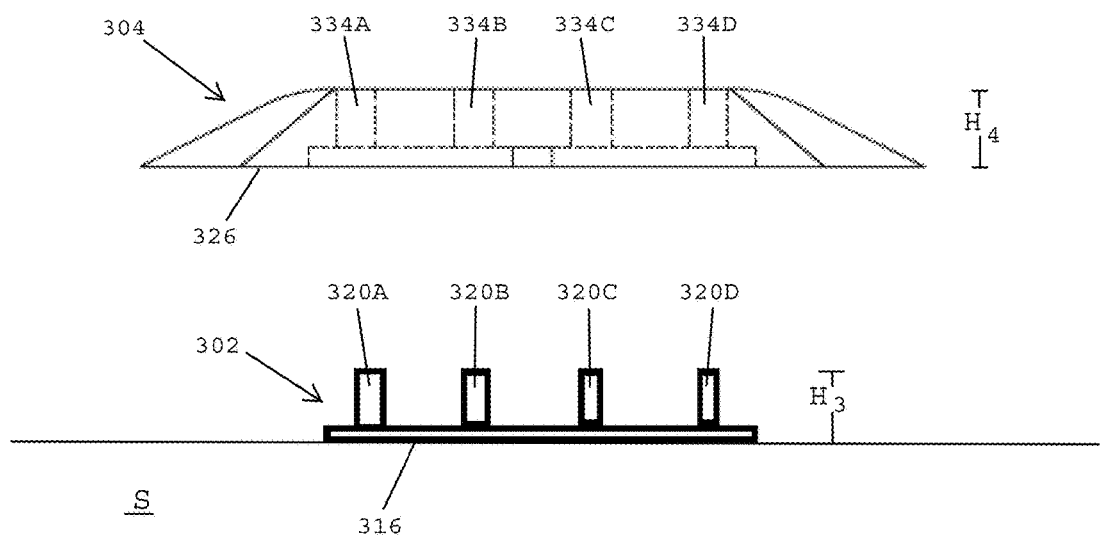
FIG. 20A shows a front elevation view of the protective cover of FIGS. 19A-19B and a spray manifold.
Figure 20B:
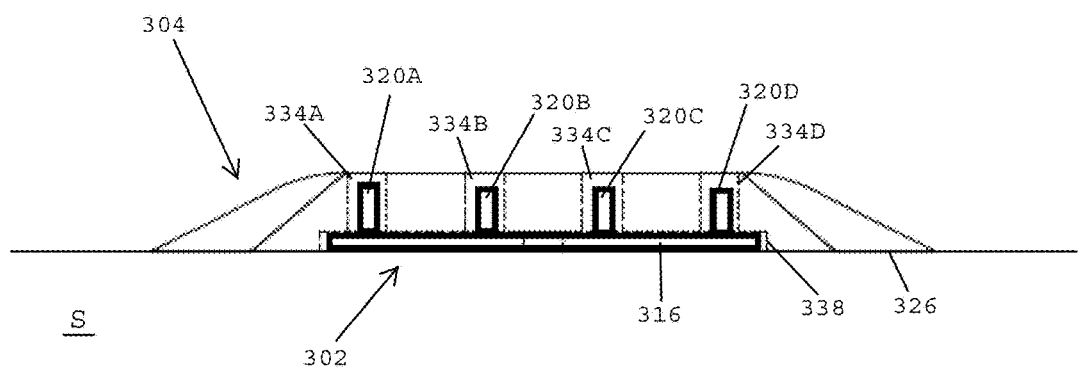
FIG. 20B shows a front elevation view of the protective cover and the spray manifold of FIG. 20A assembled together.
Figure 21A:
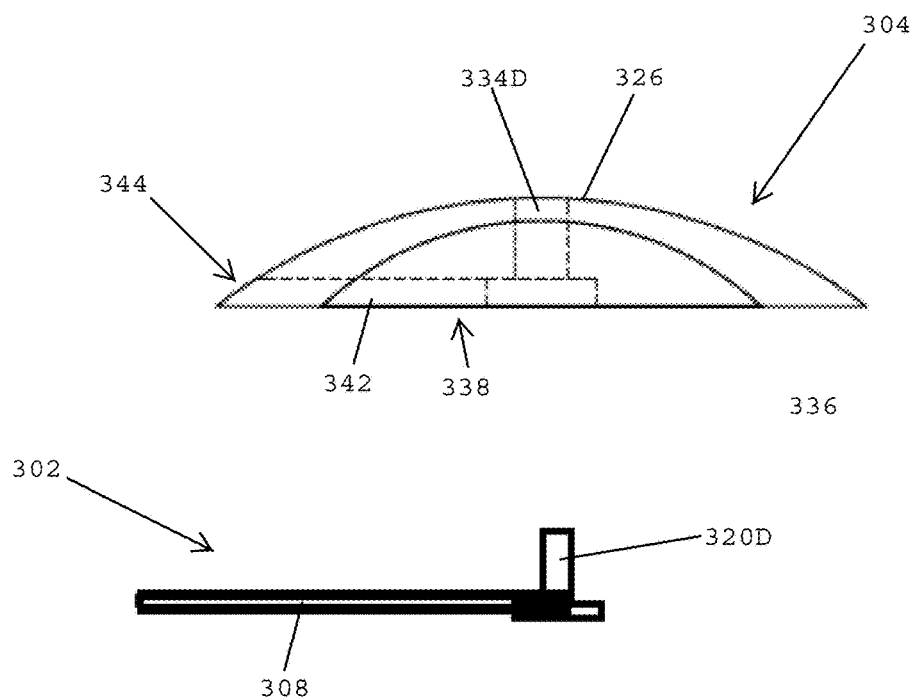
FIG. 21A shows a side elevation view of the protective cover and the spray manifold of FIG. 20A.
Figure 21B:
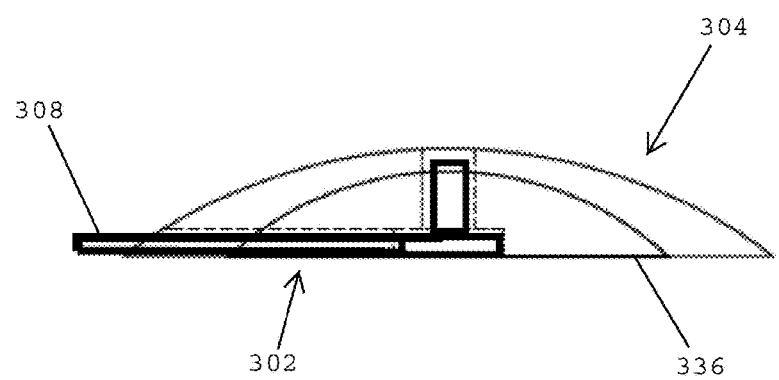
FIG. 21B shows a side elevation view of the protective cover and the spray manifold of FIG. 21A assembled together.
Figure 22:
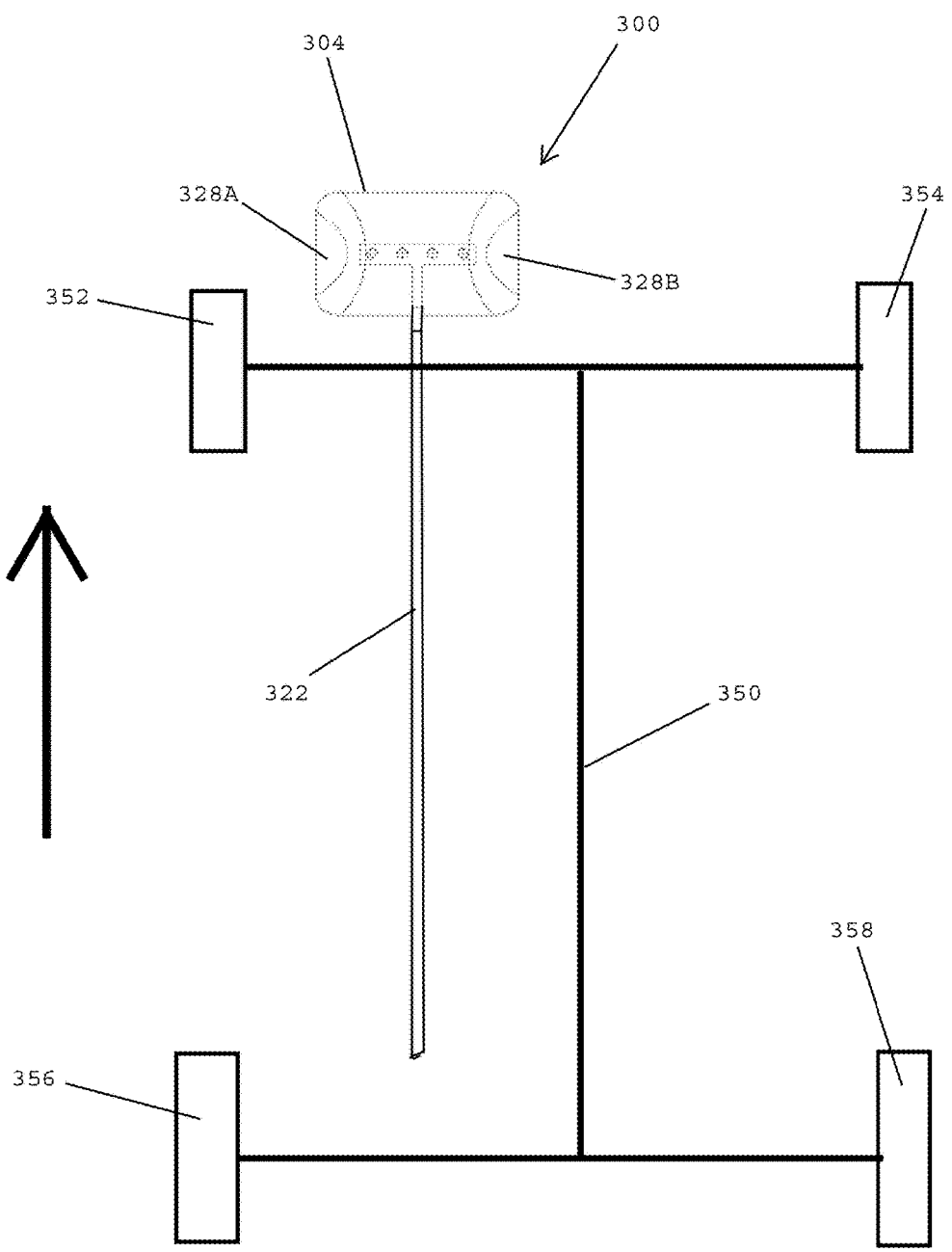
FIG. 22 shows a schematic view of a portable undercarriage washer for a vehicle, in accordance with one embodiment of the present invention.

Referring to FIG. 13, in one embodiment, a portable undercarriage washer 200 preferably includes a spray manifold 202 and a protective cover 204. The spray manifold 202 desirably includes a spray bar 216 having spaced spray nozzles 220A-220D and a feed line 208 that provides water to the spray bar. The feed line 208 has a proximal end 210 with a male connector 212 that is attached to a female connector 224 at the distal end of a washing fluid supply line 222.

In one embodiment, the protective cover 204 may be a molded element such as a molded rubber element. In other embodiments, the protective cover 204 may be a polymer, or made of rubber, metal, plastic and/or wood. In one embodiment, the protective cover is made of any material that is sufficiently rugged to withstand a vehicle tire rolling over the cover. The protective cover 204 preferably has a top surface 226, spaced openings 234A-234D, and sloping side walls 228A, 228B, 230A, and 230B.

Referring to FIG. 14, the protective cover 204 desirably has a bottom surface 236 with a recess 238 formed in the bottom surface. The recess 238 preferably includes a longer section 240 that is aligned with and intersects the spaced openings 234A-234D and a shorter section 242 that intersects with the middle of the longer section 240 and extends to the rear edge 246 of the protective cover 204.

Referring to FIGS. 14 and 15, in one embodiment, the spray manifold 202 is assembled with the protective cover 204 by aligning the spray nozzles 220A-220D (FIG. 13) with the spaced openings 234A-234D of the protective cover. The spray nozzles of the spray manifold are desirably inserted into the spaced openings 238A-238D of the protective cover 204. In addition, the spray bar 216 is preferably pressed into the longer section 240 of the recess 238, and the feed line 208 is preferably pressed into the shorter section 242 of the recess 238. The inner dimensions of the recess 238 preferably match or are slightly smaller than the outer dimensions of the spray bar 216 and the feed line 208 to form a friction fit connection between the spray manifold 202 and the protective cover 204. As a result of the friction fit connection, in one embodiment, the protective cover and the spray manifold will remain assembled together until the two components are physically pulled apart.

Referring to FIG. 16, in one embodiment, the spray nozzles 220A-220D generate respective spray patterns that overlap with one another. The spacing between the spray nozzles used may be modified to change the spray pattern and/or the degree of overlap of adjacent sprays. In one embodiment, the diverging angle of the spray pattern may be changed to accommodate varying distances between the undercarriage of a vehicle and the spray manifold 202.

Referring to FIG. 17, in one embodiment, when the protective cover 204 and the spray manifold 202 are assembled together, the spray nozzles 220A-220D are disposed within the spaced openings 234A-234D of the protective cover 204. The protective cover 204 has a height that is greater than the height of the spray nozzles 220A-220D so that the tops of the spray nozzles are below the top surface 226 of the protective cover 204 for being protected from damage by the rugged protective cover.

Referring to FIGS. 18A and 18B, when the spray manifold 202 and the protective cover 204 are assembled together, the male connector 212 at the proximal end of the feed line 208 of the spray manifold is accessible through a notch provided at the proximal end of the shorter section 242 of the recess 238 (FIG. 14) formed in the bottom surface of the protective cover 204. The protective cover desirably has sloping side walls 228A, 228B, 230A, 230B that slope downwardly and outwardly between the top surface 226 of the protective cover 204 and the bottom surface 236 of the protective cover. The sloping side walls desirably provide gentle tactile feedback to a driver when a vehicle tire rolls over one of the sloping side walls.

Referring to FIGS. 19A and 19B, in one embodiment, a protective cover 304 has a top surface 326, an outer perimeter 336, and sloping walls 328A, 328B, 330A, 330B that slope downwardly and outwardly between the top surface 226 and the outer perimeter 336. The protective cover 304 preferably has spaced openings 334A-334D that are spaced from one another along the length of the cover 304. In one embodiment, the protective cover 304 has a length $L_2$ of about 1-3 feet and a width $W_2$ of about 0.5-1.5 feet and more preferably about one foot. Referring to FIG. 19B, the protective cover 304 preferably has a recess 338 formed in the bottom surface thereof that includes a longer section 340 aligned with the spaced openings 334A-334D and a shorter section 342 that intersects the longer section. The proximal end of the shorter section 342 includes a notch 344 that opens at a rear edge 346 at the outer perimeter 336 of the protective cover 304.

Referring to FIG. 20A, in one embodiment, a spray manifold 302 including a spray bar 316 having spray nozzles 320A-320D is placed over a surface S with the spray nozzles 320A-320D projecting away from the surface S. The bottom surface 326 of the protective cover 304 is juxtaposed with the spray manifold, and the spaced openings 334A-334D of the protective cover 304 are aligned with the spaced spray nozzles 320A-320D. The bottom surface of the protective cover 304 has the recess 338 formed therein that forms a friction fit with the spray bar 316 of the spray manifold 302.

In one embodiment, the spray nozzles 320A-320D desirably have a height $H_3$ that is less than the height $H_4$ of the protective cover 304. Referring to FIGS. 20B and 21A-21B, when the protective cover 304 and the spray manifold 302 are assembled together, the shorter spray nozzles 320A-320D having height $H_3$ are below the top surface 326 of the protective cover 304 for being protected within the spaced openings 334A-334D of the protective cover 304 having a height $H_4$. As a result, the greater height $H_4$ of the protective cover 304 shields and protects the spray nozzles 320A-320D from damage that could occur when a vehicle tire runs over the top of the protective cover 304.

Referring to FIGS. 21A and 21B, the feed line 308 of the spray manifold 302 projects through both the notch 344 and the shorter section 342 of the recess 338 formed in the bottom surface 336 of the protective cover 304.

Referring to FIG. 22, in one embodiment, a portable undercarriage washer 300 including a protective cover 304 and a supply line for supplying high pressure water is positioned over a surface such as the floor of a motor pool or a parking lot. The portable nature of the system enables the washer 300 to be transported and positioned anywhere that is desired by an operator. The washer system is activated for spraying water from spray nozzles as described above. A vehicle 350 having at least a front left wheel 352, a front right wheel 354, a rear left wheel 356 and a rear right wheel 358 is driven over the protective cover 304 in the direction indicated DIR1. To clean the undercarriage, the driver of the vehicle may make numerous passes over the protective cover. As the vehicle passes over the protective cover 304, the spray nozzles spray high pressure water at the undercarriage to remove contaminants.

In one embodiment, in order to insure that the left-most section of the undercarriage is treated, the driver will attempt to roll the left wheels 352, 356 over the sloping side surface 328A of the protective carrier. Although the present invention is not limited by any particular theory of operation, it is believed that providing the sloping side surface 328A on the protective carrier will provide tactile feedback to the driver that the left-most section of the undercarriage has been treated without requiring the driver to get out of the cab of the vehicle. In one embodiment, in order to insure that the right-most section of the undercarriage is treated, the driver will attempt to roll the right wheels 354, 358 over the opposite sloping side surface 328B of the protective carrier 304. During a cleaning cycle, a driver may be required to make numerous passes over the undercarriage washer 300 to insure that the entire undercarriage of the vehicle has been successfully treated. In one embodiment, the driver continuously loops around the washer 300 in either a clockwise or counterclockwise direction to pass over the washer 300. In one embodiment, a driver may drive a forward loop over the protective cover five to ten times, shifting to the left or the right on each pass. As the driver loops around the washer, the driver preferably drives in the forward direction.

Figure 23A:
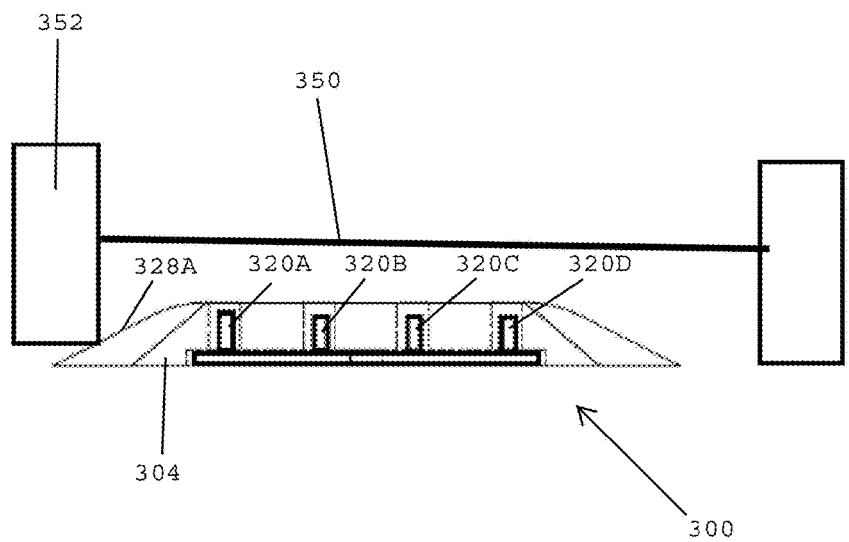
FIGS. 23A and 23B show a method of using a portable undercarriage washer for washing a vehicle, in accordance with one embodiment of the present invention.
Figure 23B:
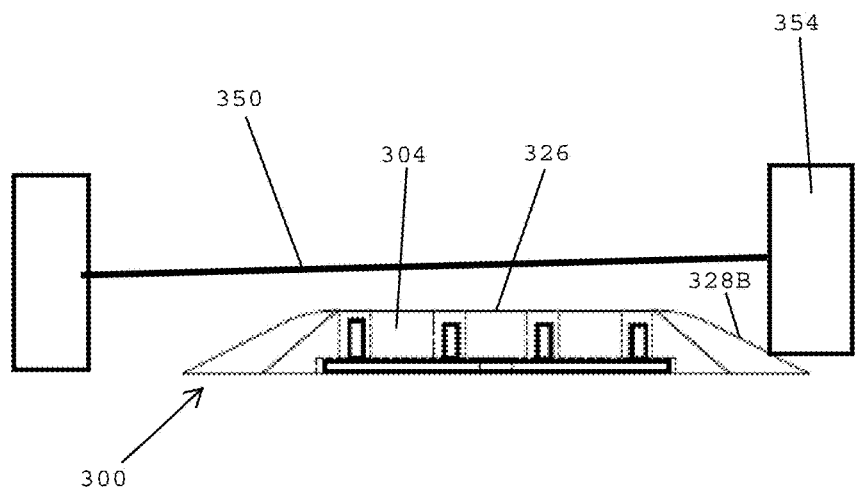

Referring to FIG. 23A, in one embodiment, the driver insures that the left-most side of the undercarriage of the vehicle 350 has been washed by driving the left front tire 352 of the vehicle over the sloping side surface 328A of the protective cover 304. As the driver passes over the protective cover 304, the spray nozzles 320A-320D spray high pressure water through the spaced openings in the protective cover for treating the undercarriage. In one embodiment, the driver makes numerous passes over the washer 300 for treating other sections of the undercarriage (e.g., mid-sections of the undercarriage). Each time the driver passes over the protective cover 304, the driver preferably drifts to the left until the right front tire 354 rolls over the sloping side surface 328B, which provides tactile feedback confirming that the right-most section of the undercarriage has been successfully treated by the washer 300.

The sloping side surfaces 328A, 328B provide a gentle transition between the outer perimeter of the protective cover and the top surface 326 of the protective cover 304 that is more gradual than would occur when using vertical side walls at the outer perimeter. This enables the tires of a vehicle to more smoothly roll over the outer edge of the protective cover 304 without violently jarring the vehicle.

While the foregoing is directed to embodiments of the present invention, other and further embodiments of the invention may be devised without departing from the basic scope thereof, which is only limited by the scope of the claims that follow. For example, the present invention contemplates that any of the features shown in any of the embodiments described herein, or incorporated by reference herein, may be incorporated with any of the features shown in any of the other embodiments described herein, or incorporated by reference herein, and still fall within the scope of the present invention.

What is claimed is:

1. A portable undercarriage washer for vehicles comprising:
   a spray manifold including a plurality of spaced spray nozzles;
   a protective cover having a top surface with a plurality of spaced openings, said protective cover overlying said spray manifold and said spaced spray nozzles, wherein the spacing between said spaced openings matches the spacing between said spaced spray nozzles so that said spaced spray nozzles are aligned with said spaced openings, wherein said top surface of said protective cover defines a height that is greater than or equal to the height of said spaced spray nozzles, wherein said protective cover has side walls that slope downwardly and outwardly from said top surface of said protective cover to a bottom surface of said protective cover, wherein said spray manifold and said protective cover are configured to be placed over a surface, and wherein said spray manifold and said bottom surface of said protective cover are configured to be in contact with the surface.

2. The portable undercarriage washer as claimed in claim 1, wherein said spray manifold comprises:
   a feed line having a proximal end and a distal end;
   a spray bar connected with the distal end of said feed line;
   said spray bar having spaced openings extending along the length thereof;
   each said spaced spray nozzle being connected to one of said spaced openings on said spray bar.

3. The portable undercarriage washer as claimed in claim 2, wherein said spaced spray nozzles are releasably secured to said spaced openings on said spray bar.

4. The portable undercarriage washer as claimed in claim 3, further comprising different sets of spray nozzles, wherein each of the sets generates a spray pattern having a unique spray angle.

5. The portable undercarriage washer as claimed in claim 4, wherein said unique spray angle for the sets of said spray nozzles include 15 degrees, 25 degrees, 45 degrees and 65 degrees.

6. The portable undercarriage washer as claimed in claim 2, wherein said spray manifold further comprises a support plate having a top surface, wherein said feed line and said spray tube are attached to the top surface of said support plate.

7. The portable undercarriage washer as claimed in claim 6, wherein said support plate is flat.

8. The portable undercarriage washer as claimed in claim 7, wherein said spaced openings extend from said top surface to said bottom surface of said protective cover, and wherein said protective cover overlies said support plate so that said top surface of said support plate opposes said bottom surface of said protective cover.

9. The portable undercarriage washer as claimed in claim 7, wherein said bottom surface of said protective cover has a recess formed therein, wherein said spaced openings extend from said top surface to said bottom surface, and wherein said protective cover overlies said support plate so that said support plate, said spray tube, and said feed line are disposed in said recess formed in said bottom surface of said protective cover.

10. The portable undercarriage washer as claimed in claim 1, wherein said protective cover comprises said top surface and a bottom surface having a recess formed therein, wherein said spaced openings extend from said top surface to said bottom surface, and wherein said protective cover overlies said spray manifold with said spray tube and said feed line disposed in said recess formed in said bottom surface of said protective cover.

11. The portable undercarriage washer as claimed in claim 10, wherein said spray tube and said feed line form a friction fit with said recess formed in said bottom surface of said protective cover.

12. The portable undercarriage washer as claimed in claim 1, further comprising a washer fluid supply line connected with the proximal end of said feed line for supplying washer fluid to said spray manifold.

13. The portable undercarriage washer as claimed in claim 1, wherein said bottom surface of said protective cover has a recess formed therein, and wherein said spray manifold and said protective cover are held together by a friction fit formed between an outer dimension of said spray manifold and an inner dimension of said recess formed in said bottom surface of said protective cover.

14. A portable undercarriage washer for vehicles comprising:
   a spray manifold including a feed line having a proximal end and a distal end, a spray tube connected with the distal end of said feed line, and a plurality of spaced spray nozzles connected with spaced openings on said spray tube;
   a protective cover overlying said spray manifold and said spaced spray nozzles, said protective cover having a top surface, a bottom surface, a plurality of spaced openings extending between said top and bottom surfaces, and a recess formed in said bottom surface, wherein the spacing between said spaced openings matches the spacing between said spaced spray nozzles, wherein said protective cover has a height that is greater than or equal to the height of said spaced spray nozzles, wherein said protective cover has side walls that slope downwardly and outwardly from said top surface of said protective cover to said bottom surface of said protective cover, wherein said spray manifold and said protective cover are configured to be placed on the ground, and wherein said spray manifold and said bottom surface of said protective cover are configured to be in contact with the ground.

15. The portable undercarriage washer as claimed in claim 14, wherein said feed line and said spray tube are disposed in said recess formed in said bottom surface of said protective cover.

16. The portable undercarriage washer as claimed in claim 15, wherein inner dimensions of said recess formed in said bottom surface of said protective cover are less than or equal to outer dimensions of said feed line and said spray tube, and wherein said feed line and said spray tube form a friction fit with said recess formed in said bottom surface of said protective cover.

17. The portable undercarriage washer as claimed in claim 14, wherein said spaced spray nozzles are disposed in said respective spaced openings of said protective cover, and wherein said protective cover has a height that is greater than the height of said spaced spray nozzles so that said spaced spray nozzles are below said top surface of said protective cover.

18. The portable undercarriage washer as claimed in claim 14, wherein said protective cover comprises a material selected from the group consisting of rubber, molded rubber, polymers, metal, plastic, and wood.

19. The portable undercarriage washer as claimed in claim 14, wherein said top surface of said protective cover has a dome shape and said sloping slide walls include a front sloping slide wall, a rear sloping side wall, and a pair of lateral sloping side walls, wherein said sloping side walls extend from said top surface to said bottom surface of said protective cover.

20. The portable undercarriage washer as claimed in claim 19, wherein said feed line projects from said rear sloping side wall for connection with a washer fluid supply line.

* * * * *